US012670548B2

(12) United States Patent
Jo et al.

(10) Patent No.: US 12,670,548 B2
(45) Date of Patent: Jun. 30, 2026

(54) METHOD AND APPARATUS FOR SUPER RESOLUTION

(71) Applicant: SAMSUNG ELECTRONICS CO., LTD., Suwon-si (KR)

(72) Inventors: Younghyun Jo, Suwon-si (KR); Sehwan Ki, Suwon-si (KR); Eunhee Kang, Suwon-si (KR); Hyong Euk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 530 days.

(21) Appl. No.: 18/175,703

(22) Filed: Feb. 28, 2023

(65) Prior Publication Data

US 2024/0087087 A1     Mar. 14, 2024

(30) Foreign Application Priority Data

Sep. 14, 2022     (KR) ......................... 10-2022-0115820

(51) Int. Cl.
*G06T 3/4076*     (2024.01)
*G06T 3/4046*     (2024.01)

(52) U.S. Cl.
CPC .......... *G06T 3/4076* (2013.01); *G06T 3/4046* (2013.01)

(58) Field of Classification Search
CPC ... G06T 3/4076; G06T 3/4046; G06T 3/4053; G06T 3/4007; G06T 5/70; G06T 3/40; G06T 5/60; G06T 5/50; G06T 5/92; G06T 5/73; H04N 7/0135; G06N 3/02; G06N 3/0464
See application file for complete search history.

(56) References Cited

U.S. PATENT DOCUMENTS 12,175,632 B2 *  12/2024  Gao ...................... G06V 10/806
12,198,297 B2 *  1/2025  Chen ...................... G06N 3/063
(Continued)

FOREIGN PATENT DOCUMENTS

CN         111461991 A  *  7/2020  ............. G16H 30/40
CN         114041161 B  *  12/2024  ............... G06T 5/60
(Continued)

OTHER PUBLICATIONS

Tlan Chunwei "A Tree-Guided CNN for Image Super-Resolution", May 2025, IEEE (Year: 2025).*
(Continued)

*Primary Examiner* — John Villecco
*Assistant Examiner* — Alejandro Hernandez
(74) *Attorney, Agent, or Firm* — F. CHAU & ASSOCIATES, LLC

(57)     ABSTRACT

Systems and methods for super-resolution (SR) are described. The SR method includes determining a direction type of an input image based on a gradient of the input image, obtaining a first intermediate image based on the direction type using a look-up table (LUT) that stores an SR operation result of a pixel value combination corresponding to a kernel set mapped to the determined direction type, wherein the first intermediate image is an SR image corresponding to the input image, applying SR interpolation to the input image to obtain a baseline image, and obtaining an output image based on the first intermediate image and the baseline image.

20 Claims, 15 Drawing Sheets

(56)                References Cited

U.S. PATENT DOCUMENTS

| | | | |
|---|---|---|---|
| 2005/0073607 A1* | 4/2005 | Ji | H04N 7/012 |
| | | | 348/E7.012 |
| 2009/0060286 A1* | 3/2009 | Wheeler | G06V 40/19 |
| | | | 382/117 |
| 2011/0026840 A1* | 2/2011 | Tao | G06V 20/35 |
| | | | 382/224 |
| 2013/0128111 A1 | 5/2013 | Corral-Soto | |
| 2013/0308877 A1* | 11/2013 | Tezuka | G06T 3/4007 |
| | | | 382/300 |
| 2015/0179293 A1* | 6/2015 | Mukaide | G01N 23/203 |
| | | | 378/89 |
| 2016/0352998 A1* | 12/2016 | Huang | H04N 23/745 |
| 2019/0266827 A1* | 8/2019 | Miao | G01N 21/59 |
| 2020/0285883 A1* | 9/2020 | Hiasa | G06F 18/2148 |
| 2021/0027426 A1* | 1/2021 | Ma | G06T 5/70 |
| 2021/0233210 A1* | 7/2021 | Elron | G06T 3/4046 |
| 2021/0319534 A1* | 10/2021 | Liu | G06T 5/50 |
| 2021/0407042 A1* | 12/2021 | Berthelot | G06T 3/4046 |
| 2022/0122223 A1* | 4/2022 | Choi | G06T 5/70 |
| 2022/0148130 A1* | 5/2022 | Tang | G06N 3/044 |
| 2022/0405882 A1* | 12/2022 | Ferrés | G06T 3/4046 |
| 2023/0177647 A1* | 6/2023 | Kim | G06T 3/4007 |
| | | | 382/155 |
| 2023/0298135 A1* | 9/2023 | Cao | G06T 3/4046 |
| | | | 382/299 |
| 2024/0029203 A1* | 1/2024 | Xu | G06T 5/50 |
| 2024/0087087 A1* | 3/2024 | Jo | G06T 3/4076 |
| 2024/0171871 A1* | 5/2024 | Kim | H04N 25/704 |
| 2024/0404001 A1* | 12/2024 | Jin | G06T 3/4007 |
| 2025/0014147 A1* | 1/2025 | Jo | G06T 3/4007 |
| 2025/0078204 A1* | 3/2025 | Zha | G06T 3/4046 |
| 2025/0111602 A1* | 4/2025 | Croxford | G06T 11/40 |
| 2025/0148270 A1* | 5/2025 | Cho | G06N 3/0475 |
| 2025/0217969 A1* | 7/2025 | Hsu | G06T 7/33 |
| 2025/0267374 A1* | 8/2025 | Jang | H04N 25/46 |
| 2025/0371325 A1* | 12/2025 | Crabtree | G06F 16/483 |

| | | | |
|---|---|---|---|
| 2026/0007313 A1* | 1/2026 | Chen | A61B 5/0095 |
| 2026/0038085 A1* | 2/2026 | Berbecel | G06T 3/4053 |
| 2026/0038215 A1* | 2/2026 | Villanueva-Barreiro | |
| | | | G06T 19/20 |

FOREIGN PATENT DOCUMENTS

| | | | | |
|---|---|---|---|---|
| KR | 10-1795271 | 11/2017 | | |
| KR | 10-2019-0087262 | 7/2019 | | |
| KR | 10-2337412 | 12/2021 | | |
| KR | 10-2342940 | 12/2021 | | |
| KR | 20240035992 A | * | 3/2024 | G06T 3/4053 |

OTHER PUBLICATIONS

Kim, et al., "2X Super-Resolution Hardware Using Edge-Orientation-Based Linear Mapping for Real-Time 4K UHD 60 fps Video Applications", IEEE Transactions on Circuits and Systems—II: Express Briefs, vol. 65, No. 9, Sep. 2018, pp. 1274-1278.

Zhang, et al., "Learning a Single Convolutional Super-Resolution Network for Multiple Degradations", 2018 TEEE/CVF Conference on Computer Vision and Pattern Recognition, pp. 3262-3271.

Bae, et al., "Cost-Efficient Super-Resolution Hardware Using Local Binary Pattern Classification and Linear Mapping for Real-Time 4K Conversion", IEEE Access, vol. 8, Dec. 29, 2020, pp. 224383-224393.

Extended European Search Report dated Feb. 13, 2024 for the corresponding European Patent Application No. 23183254.4 , 13 pages.

Xin, et al., "Binarized Neural Network for Single Image Super Resolution", pp. 1-17, 2020.

Lee, et al., "Journey Towards Tiny Perceptual Super-Resolution", arXiv preprint: arXiv:2007.04356v1 [eess.IV] Jul. 8, 2020, 21 pages.

Du, et al., "Anchor-based Plain Net for Mobile Image Super-Resolution", Computer Vision Foundation, pp. 1-9, 2021.

Jo, et al. "Practical Single-Image Super-Resolution Using Look-Up Table", Computer Vison Foundation, pp. 691-700, 2021.

Liang, et al., "SwinIR: Image Restoration Using Swin Transformer", Computer Vision Foundation, pp. 1833-1844, 2021.

* cited by examiner

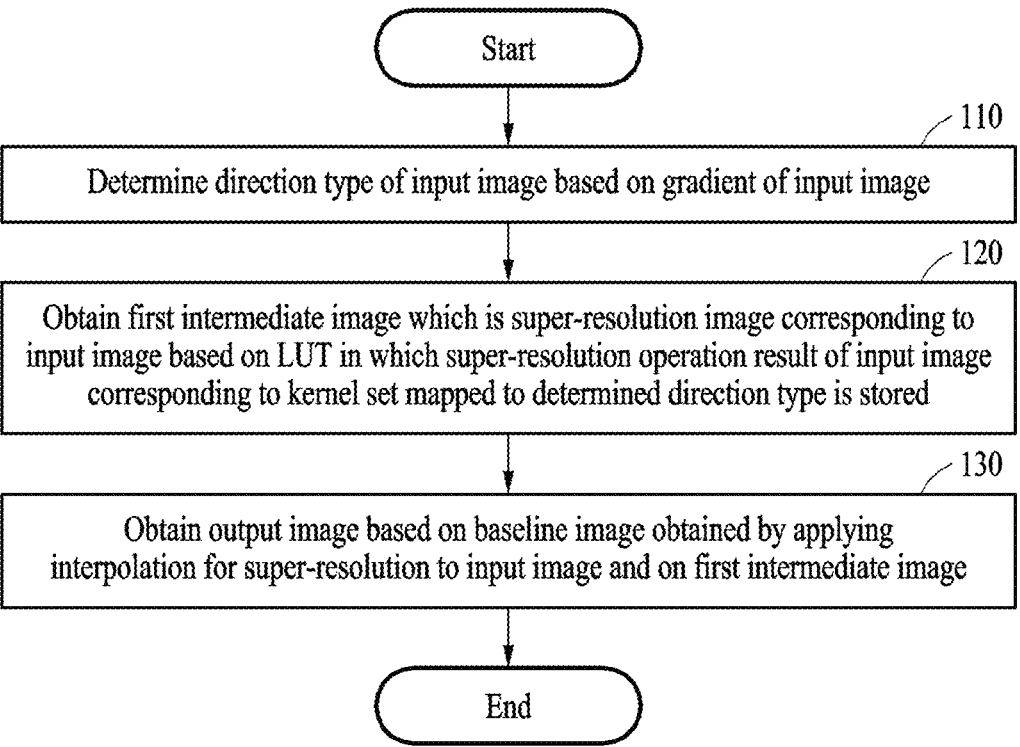

Start

110

Determine direction type of input image based on gradient of input image

120

Obtain first intermediate image which is super-resolution image corresponding to
input image based on LUT in which super-resolution operation result of input image
corresponding to kernel set mapped to determined direction type is stored

130

Obtain output image based on baseline image obtained by applying
interpolation for super-resolution to input image and on first intermediate image End

FIG. 1

Capture a low-resolution image
using a camera ⟍1205

Calculate gradients of the image ⟍1210

Compute an intermediate image
using a lookup table ⟍1215

Display a high-resolution version
of the image ⟍1220

1200

METHOD AND APPARATUS FOR SUPER RESOLUTION

CROSS-REFERENCE TO RELATED APPLICATION

This application claims priority to and benefit under 35 USC § 119(a) of Korean Patent Application No. 10-2022-0115820 filed on Sep. 14, 2022, in the Korean Intellectual Property Office, the entire disclosure of which is incorporated by reference herein for all purposes.

BACKGROUND

1. Field

The following description relates to image super-resolution (SR), and in some embodiments, to a super-resolution method and apparatus in a mobile environment.

2. Description of Related Art

Image SR may be used to obtain a high-resolution (HR) image from a single low-resolution (LR) image. Image SR may increase image quality and may also zoom an image by increasing the size of small objects in the image. Examples of image SR include interpolation-based SR (e.g., nearest, bilinear, and bicubic interpolation) and deep learning-based SR.

However, SR techniques may be computationally expensive, and may not be suitable for implementation in resource limited environments such as on a mobile device. Therefore, there is a need in the art for improved SR models that can be utilized in resource limited environments.

SUMMARY

This Summary provides a selection of concepts that are further described herein. The Summary is not intended to define key features or essential features of the claimed subject matter, nor is it intended to be used as an aid in determining the scope of the claimed subject matter.

The present disclosure describes a super-resolution (SR) processing model that is sufficiently lightened in weight to enable real-time processing in a mobile environment. Some embodiments of the present disclosure provide a low-complexity SR processing method that selectively uses processing blocks in a mobile device according to an environment where a camera is used. However, the technical aspects are not limited to the foregoing aspects, and other technical aspects may also be present.

In one aspect, a method includes: determining a direction type of an input image based on a gradient of the input image; obtaining a first intermediate image based on the direction type using a look-up table (LUT) that stores an SR operation result of a pixel value combination corresponding to a kernel set mapped to the determined direction type, wherein the first intermediate image is an SR image corresponding to the input image; applying SR interpolation to the input image to obtain a baseline image; and obtaining an output image based on the first intermediate image and the baseline image.

The obtaining of the first intermediate image may include extracting a non-flat region from the input image based on the gradient; and obtaining the first intermediate image corresponding to the non-flat region based on a value stored in the LUT corresponding to the non-flat region of the input image.

The LUT may include SR operation results respectively corresponding to kernels included in kernel sets mapped to preset direction types. The SR operation result may include a pixel value of the SR image mapped to each of pixel value combinations corresponding to the size of the kernel.

The obtaining of the output image may include obtaining an intermediate output image based on the baseline image and the first intermediate image; obtaining a second intermediate image by applying the input image to a neural network for SR; and obtaining the output image based on the second intermediate image and the intermediate output image.

The obtaining of the second intermediate image may include obtaining the second intermediate image by applying the input image and a tuning parameter for image processing to the neural network. The neural network may include a neural network that is trained to output the SR image of a high resolution, based on a low-resolution image and a tuning parameter corresponding to the low-resolution image.

The tuning parameter may include at least one of a value indicating a noise level of the input image, a blurring kernel of the input image, or a standard deviation of a Gaussian kernel for blurring the input image. The SR method may further include outputting in real time the intermediate output image through a camera preview; and providing the output image as a captured image of the input image.

The obtaining of the output image may include obtaining the output image based on the second intermediate image corresponding to the non-flat region of the input image and the intermediate output image. The non-flat region of the input image may include at least a portion of the input image extracted based on the gradient of the input image.

The obtaining of the first intermediate image may include obtaining a second intermediate image by applying the input image to a neural network for SR; and obtaining the first intermediate image which is a corrected SR image corresponding to the second intermediate image, based on a LUT in which an SR correction result of the pixel value combination corresponding to the kernel set mapped to the determined direction type is stored.

The obtaining of the output image may include obtaining an intermediate output image based on the baseline image and the first intermediate image; and obtaining the output image by applying the intermediate output image to a neural network for SR correction.

The determining of the direction type of the input image may include obtaining a differential element for each axis of the input image by applying a mask for a differential for each axis of the input image; and determining one of preset direction types as the direction type of the input image, based on an angle of the gradient of the input image obtained from the differential element for each axis of the input image.

The obtaining of the output image may include obtaining the output image based on a sum of a pixel value of the baseline image and a pixel value of the first intermediate image.

In another general aspect, an apparatus with SR image processing includes at least one processor. The processor may determine a direction type of an input image based on a gradient of the input image; obtain a first intermediate image based on the direction type using a look-up table (LUT) that stores an SR operation result of a pixel value combination corresponding to a kernel set mapped to the determined direction type, wherein the first intermediate image is an SR image corresponding to the input image; apply SR interpolation to the input image to obtain a baseline image; and obtain an output image based on the first intermediate image and the baseline image.

The apparatus may further include a memory configured to store therein the LUT.

For obtaining the first intermediate image, the processor may extract a non-flat region from the input image based on the gradient; and obtain the first intermediate image corresponding to the non-flat region, based on a value stored in the LUT corresponding to the non-flat region of the input image.

For obtaining the output image, the processor may obtain an intermediate output image based on the baseline image and the first intermediate image; obtain a second intermediate image by applying the input image to a neural network for SR; and obtain the output image based on the second intermediate image and the intermediate output image.

For obtaining the second intermediate image, the processor may obtain the second intermediate image by applying the input image and a tuning parameter for image processing to the neural network. The neural network may include a neural network that is trained to output the SR image of a high resolution, based on a low-resolution image and a tuning parameter corresponding to the low-resolution image.

For obtaining the first intermediate image, the processor may obtain a second intermediate image by applying the input image to a neural network for SR; and obtain the first intermediate image which is a corrected SR image corresponding to the second intermediate image, based on a LUT in which an SR correction result of the pixel value combination corresponding to the kernel set mapped to the determined direction type is stored.

For obtaining the output image, the processor may obtain an intermediate image based on the baseline image and the first intermediate image; and obtain the output image by applying the intermediate output image to a neural network for SR correction.

In another aspect, a method includes obtaining an input image including a first part and a second part; computing a first gradient for the first part and a second gradient for the second part based on the input image; obtaining a first kernel shape for the first part and a second kernel shape for the second part based on the first gradient and the second gradient, respectively, wherein the first kernel shape and the second kernel shape are obtained from a LUT and wherein the second kernel shape is different from the first kernel shape; and generating an output image by performing SR and the input image based on the first kernel shape and the second kernel shape.

In some aspects, performing the SR further comprises applying the first kernel shape to the first part of the image and the second kernel shape to the second part of the image.

In some aspects, the method further comprises generating a baseline image using an SR interpolation process; generating a first intermediate image based on the first kernel shape and the second kernel shape; and combining the baseline image and the first intermediate image to obtain the output image.

In some aspects, the method further comprises generating a second intermediate image using an SR neural network, wherein the output image is based on a second intermediate image.

Other features and aspects will be apparent from the following detailed description, the drawings, and the claims.

BRIEF DESCRIPTION OF THE DRAWINGS

FIG. 1 is a flowchart illustrating a super-resolution (SR) method according to an example embodiment.

Figure 2:
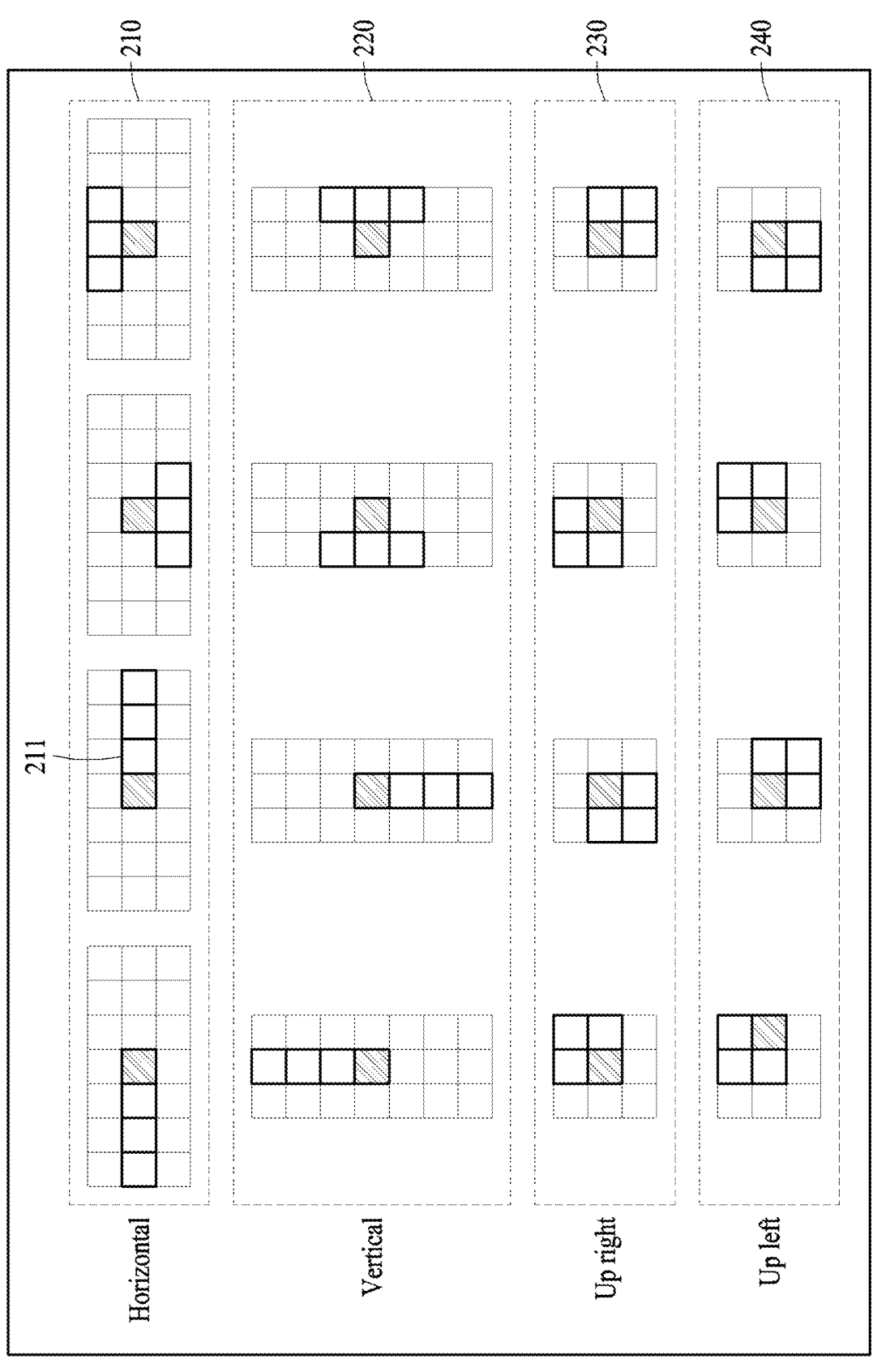
FIG. 2 is a diagram illustrating an example kernel set mapped to a direction type according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The present disclosure relates to image super-resolution (SR). Embodiments of the disclosure enable real-time image SR in a mobile environment (e.g., on a smartphone). Image SR can increase the image quality of a low-resolution (LR) image to a high-resolution (HR), e.g., using a zoom technique that enlarges objects in the image. Some smartphone cameras support up to 100× zoom, e.g., using a 10× SR technique combined with a 10× optical zoom. As smartphone performance increases, the importance of camera image quality also increases. SR technology enables improved performance for mobile devices that include a camera.

Various SR techniques may be used to generate HR images. Examples include Nearest, Bilinear processing and Bicubic Interpolation. Deep learning techniques may also be used. However, deep learning SR techniques have a high complexity, and thus a lot of computational complexity and, in some cases, restoring an LR image to an HR image may take a long time. Accordingly, it is difficult to apply deep learning SR techniques in a mobile environment such as a smartphone.

Accordingly, embodiments of the disclosure combine a look-up table (LUT) and a small-sized convolution neural network (CNN) to enable deep learning techniques to be applied in an environment with limited computational resources. A gradient may be obtained from each pixel of an input image, and a baseline output (i.e., intermediate output image) may be generated using a LUT that varies a kernel shape according to a direction of the gradient and processes it adaptively for each region. The intermediate output image may be further processed using a CNN.

Embodiments of the present disclosure include a low-complexity SR processing method that selectively uses processors and processing blocks according to the camera usage environment. Embodiments include a mobile image capturing device (e.g., a smartphone, a camera, medical imaging equipment, and semiconductor measurement equipment, etc.) that perform real-time image processing.

Some embodiments include applying a kernel shape differently according to a direction of a gradient of an input image and using a stored operation result without performing the SR operation using the LUT. In some examples, an operation result is stored according to the kernel of an SR model. Combining the LUT and the CNN may enable the generation of images with an increased resolution (i.e., an increased number of pixels) compared to conventional methods. Some embodiments include may include deep learning models utilizing quantization, pruning, low-rank approximation, knowledge distillation, and compact network design.

The following description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the example embodiments described herein. Rather, the example embodiments described herein have been provided merely to illustrate some of the many possible ways of implementing the methods, apparatuses, and/or systems described herein that will be apparent after an understanding of the disclosure of this application.

As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Terms such as "first," "second," or "initial" or "next" or "subsequent" may simply be used to distinguish the component from other components in question, and do not limit the components in other aspects (e.g., importance or order). It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

The terminology used herein is for describing various example embodiments only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, example embodiments will be described in detail with reference to the accompanying drawings, and like reference numerals in the drawings refer to like elements throughout.

FIG. 1 is a flowchart illustrating an SR method according to an example embodiment. Referring to FIG. 1, an SR method according to an example embodiment may include operation 110 of determining a direction type of an input image based on a gradient of the input image.

The input image may be a low-resolution image corresponding to an image that is a target of SR. The input image may be, for example, a raw data image obtained from a complementary metal-oxide-semiconductor (CMOS) image sensor (CIS), or an image obtained through preprocessing (e.g., white balance (WB) correction, demosaicing, etc.) by an image signal processor (ISP).

The input image may be an image including a single frame of a video that includes a plurality of frames. For example, when the input image is a video including a plurality of frames, the SR method including operations 110 through 130 may be performed on each of the frames or on a selection of the frames.

According to an example embodiment, a gradient of an image may represent data indicating a variation in pixel values between neighboring pixels in the image. For example, when a difference in brightness between a background and an object included in the image is high, a variation in pixel values may be high on a boundary of the object. Thus, a gradient on a boundary portion of the object in the image may have a greater value than in other portions of the image.

In digital imaging, a pixel (or picture element) refers to the smallest addressable element in a display device, and the smallest controllable element of a picture represented on the device. In some cases, each pixel may represent a sample of an original image. The color and intensity of each pixel is variable. In color imaging systems, a color may be represented by three or four component intensities such as red, green, and blue, or cyan, magenta, yellow, and black.

According to an example embodiment, a gradient of an image may be obtained using various edge detection methods, such as, for example, Canny, Sobel, and Prewitt methods. For example, the gradient of the image may be obtained as a vector for an x-axis differential and a y-axis differential.

Operation 110 may include obtaining a differential element for each axis of the input image by applying a mask for a differential for each axis of the input image. For example, the mask for the differential may include at least one of a Sobel mask, a Scharr mask, a Prewitt mask, or a Roberts mask. For example, axes of an image may include an x axis which is an axis in a horizontal direction of a two-dimensional (2D) image and a y axis which is an axis in a vertical direction of the 2D image. In this example, the differential element for each axis may be obtained by applying the mask for the differential to each of the x axis and the y axis of the input image and performing the differential for each axis.

For example, through an operation using a Sobel mask on an image A, a differential element Gx for an x axis of the image A and a differential element Gy for a y axis of the image A may be obtained, as represented by Equation 1 below.

$$G_x = \begin{bmatrix} +1 & 0 & -1 \\ +2 & 0 & -2 \\ +1 & 0 & -1 \end{bmatrix} * A, \quad G_y = \begin{bmatrix} +1 & +2 & +1 \\ 0 & 0 & 0 \\ -1 & -2 & -1 \end{bmatrix} * A \quad \text{[Equation 1]}$$

In Equation 1, the operation using the Sobel mask on the image A may represent a convolution operation of a pixel value of the image A and the Sobel mask.

According to an example embodiment, the direction type of the input image may be determined based on the gradient of the input image. A direction type of an image, which may refer to a type that is classified according to a direction in which a pixel value of the image changes, may include a preset number of direction types. The direction types may include, for example, a horizontal type, a vertical type, an up-right type, and an up-left type.

According to an example embodiment, operation 110 may include determining, as the direction type of the input image, one direction type from among the preset direction types, based on an angle of the gradient of the input image obtained from the differential element for each axis.

For example, an angle θ of a gradient may be obtained from differential elements (G_x, G_y) for respective axes, as represented by Equation 2 below.

$$\theta = \tan^{-1} \frac{G_y}{G_x} \quad \text{[Equation 2]}$$

A range of values of the angle θ of the gradient calculated according to Equation 2 above may be $$\left[ -\frac{\pi}{2}, \frac{\pi}{2} \right].$$

The angle θ of the gradient calculated according to Equation 2 may have a value included in a range between −90 degrees (°) or greater and 90° or less.

According to an example embodiment, the number of direction types may vary based on settings. For example, the number of direction types may be set as a value greater than or equal to 1. When the number of direction types is set higher, the number of kernels corresponding to the direction types may increase, and thus the size of a look-up table (LUT) may increase. In some examples, when the number of direction types is set to be a greater value, SR performance may be improved.

For example, the direction type of the input image may be determined as one of four direction types set in advance based on a range in which the angle θ of the gradient calculated for the input image is included, as shown in Table 1 below.

TABLE 1

| Horizontal | Up-Right (Diagonal) | Up-Left (Diagonal) | Vertical |
|---|---|---|---|
| −22.5 ≤ θ < 22.5 | 22.5 ≤ θ < 67.5 | −67.5 ≤ θ < −22.5 | else |

For example, when the angle θ of the gradient is in a range between −22.5° or greater and less than 22.5°, the direction type of the input image may be a horizontal type. For example, when the angle θ of the gradient is in a range between 22.5° or greater and less than 67.5°, the direction type of the input image may be an up-right type. For example, when the angle θ of the gradient is in a range between −67.5° or greater and less than −22.5°, the direction type of the input image may be an up-left type. For example, when the angle θ of the gradient is not in any one range among the range between −22.5° or greater and less than 22.5°, the range between 22.5° or greater and less than 67.5°, and the range between −67.5° or greater and less than −22.5°, the direction type of the input image may be a vertical type.

For example, as shown in Table 2 below, the direction type of the input image may be determined as one of two preset direction types according to a range to which the angle θ of the gradient calculated with respect to the input image belongs.

TABLE 2

| Horizontal | Vertical |
|---|---|
| −45 ≤ θ < 45 | else |

For example, when the angle θ of the gradient is in a range between −45° or greater and less than 45°, the direction type of the input image may be a horizontal type. For example, when the angle θ of the gradient is not included in the range between −45° or greater and less than 45°, the direction type of the input image may be a vertical type.

According to an example embodiment, a kernel set may be mapped to each direction type. A kernel set corresponding to the input image may be determined based on the direction type of the input image. The kernel set may refer to a set including one or more kernels. A kernel may correspond to data indicating a receptive field of an SR model that performs SR on a low-resolution image.

According to an example embodiment, the SR model may be a model that outputs an SR image corresponding to a low-resolution image input to the SR model. The SR model may include, for example, a neural network trained to output an SR image obtained by upscaling an input image by a preset multiple. In some cases, the neural network is trained using supervised learning.

Accordingly, the SR model may output pixels of the SR image corresponding to each pixel of the input image of the SR model. For example, when an upscaling multiple for SR is r, the SR model may output r 2 pixels of the SR image corresponding to one pixel of the input image.

The upscaling multiple of the SR model may be determined differently for the width and height of an image. For example, when the upscaling multiple for the width of an image is $r_1$ and the upscaling multiple for the height of the image is $r_2$, the SR model may output $r_1 \times r_2$ pixels of the SR image corresponding to one pixel of the input image.

According to an example embodiment, based on a receptive field corresponding to a specific pixel (hereinafter, a reference pixel) of an input image, the SR model may be trained to output pixels of an SR image corresponding to the reference pixel. The receptive field corresponding to the reference pixel may include pixel(s) positioned around the reference pixel, to which reference is made to output the pixels of the SR image corresponding to the reference pixel. An SR model may be trained to output the pixels of the SR image corresponding to the reference pixel by referring to the reference pixel of the input image and the pixel(s) positioned around the reference pixel. The SR model may be trained to determine values of the pixels of the SR image corresponding to the reference pixel through an operation of calculating a value of the reference pixel and value(s) of the pixel(s) positioned around the reference pixel.

According to an example embodiment, the SR model may determine the pixels around the reference pixel to which reference is made to determine a pixel value of the SR image based on the kernel set mapped to the direction type of the input image. With reference to pixels indicated by a kernel included in the kernel set, values of the pixels of the SR image corresponding to the reference pixel may be determined. For example, when the kernel set includes a plurality of kernels, the values of the pixels of the SR image corresponding to the reference pixel may be determined based on a sum of results obtained from each of the kernels.

For example, referring to FIG. 2, there may be a first kernel set 210 mapped to a horizontal type, a second kernel set 220 mapped to a vertical type, a third kernel set 230 mapped to an up-right type (i.e., a first diagonal type), and a fourth kernel set 240 mapped to an up-left type (i.e., a second diagonal type). A rectangular matrix indicated by a broken line in FIG. 2 may correspond to a partial region of an image, and one cell of the rectangular matrix may correspond to a pixel unit of the image. In addition, a figure (e.g., a FIG. 211) indicated by a solid line on the rectangular matrix indicated by the broken line in FIG. 2 may correspond to a kernel. In one example, each of the kernel sets 210, 220, 230 and 240 may include four kernels.

For example, the kernel 211 may correspond to a kernel having a size of 4, i.e., including four pixels. In this example, a shaded pixel in the kernel 211 may indicate a reference pixel, and pixel(s) of an SR image corresponding to the reference pixel may be determined based on values of pixels included in the kernel 211.

According to an example embodiment, a plurality of different kernels included in the same kernel set may have different kernel characteristics such as size and shape. A combination of kernels included in a kernel set may be different for each kernel set. For example, the shape of kernels included in the first kernel set 210 and the shape of kernels included in the second kernel set 220 may be different from each other. Although respective sizes of kernels included in each kernel set are illustrated in FIG. 2 as being the same, which is the size corresponding to four pixels, the sizes of the kernels may be different for each kernel set, dissimilar to what is shown in FIG. 2. For example, the size of kernels included in a kernel set mapped to a first direction type may be the size of 2×2 pixels, and the size of kernels included in a kernel set mapped to a second direction type may be the size of 3×3 pixels.

The SR method according to an example embodiment may include operation 120 of obtaining a first intermediate image which is an SR image corresponding to the input image, based on a LUT in which an SR operation result of a pixel value combination corresponding to the kernel set mapped to the determined direction type is stored.

According to an example embodiment, the LUT may correspond to a data structure in which SR operation results of an SR model are stored. As described above, an SR operation result corresponding to a specific pixel may be determined by pixel values of pixels in a receptive field corresponding to a kernel. The LUT may store therein SR operation results obtained using the SR model for all pixel combinations corresponding to the receptive field. The SR operation results may include pixel values of an SR image mapped to each of pixel value combinations corresponding to the size of a kernel.

Figure 3A:
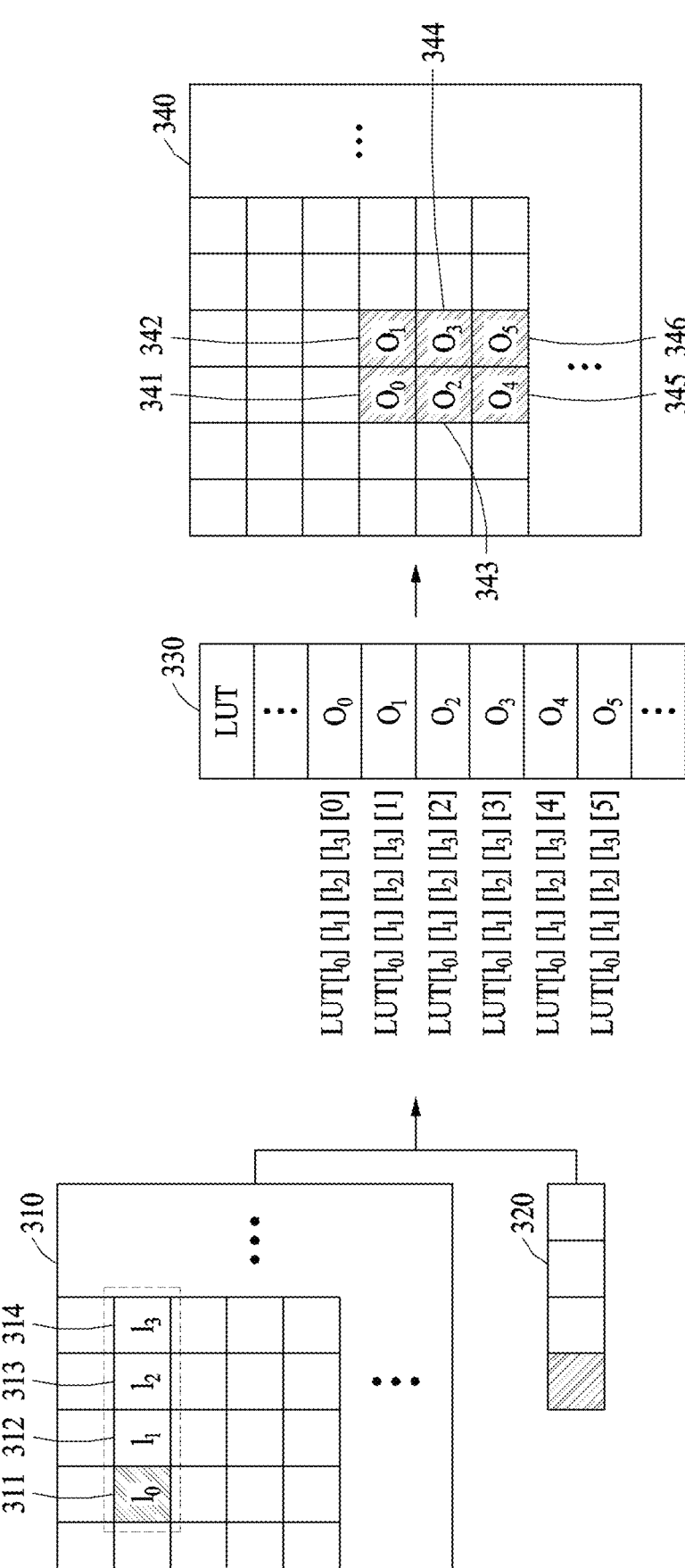
FIGS. 3A and 3B are diagrams illustrating a look-up table (LUT) process according to an example embodiment.

For example, referring to FIG. 3A, a receptive field of an input image 310 corresponding to a kernel 320 may include a reference pixel 311 and three pixels 312, 313, and 314 positioned on a right side from the reference pixel 311. A LUT 330 may store an SR operation result for a combination of four pixels which corresponds to the size of the kernel 320. For example, when the size of the kernel 320 is 4 and one pixel has an integer value greater than or equal to zero (0) and less than or equal to 255, the LUT 330 corresponding to the kernel 320 may include $256^4$ SR operation results corresponding to combinations of pixel values of four pixels.

Figure 3B:
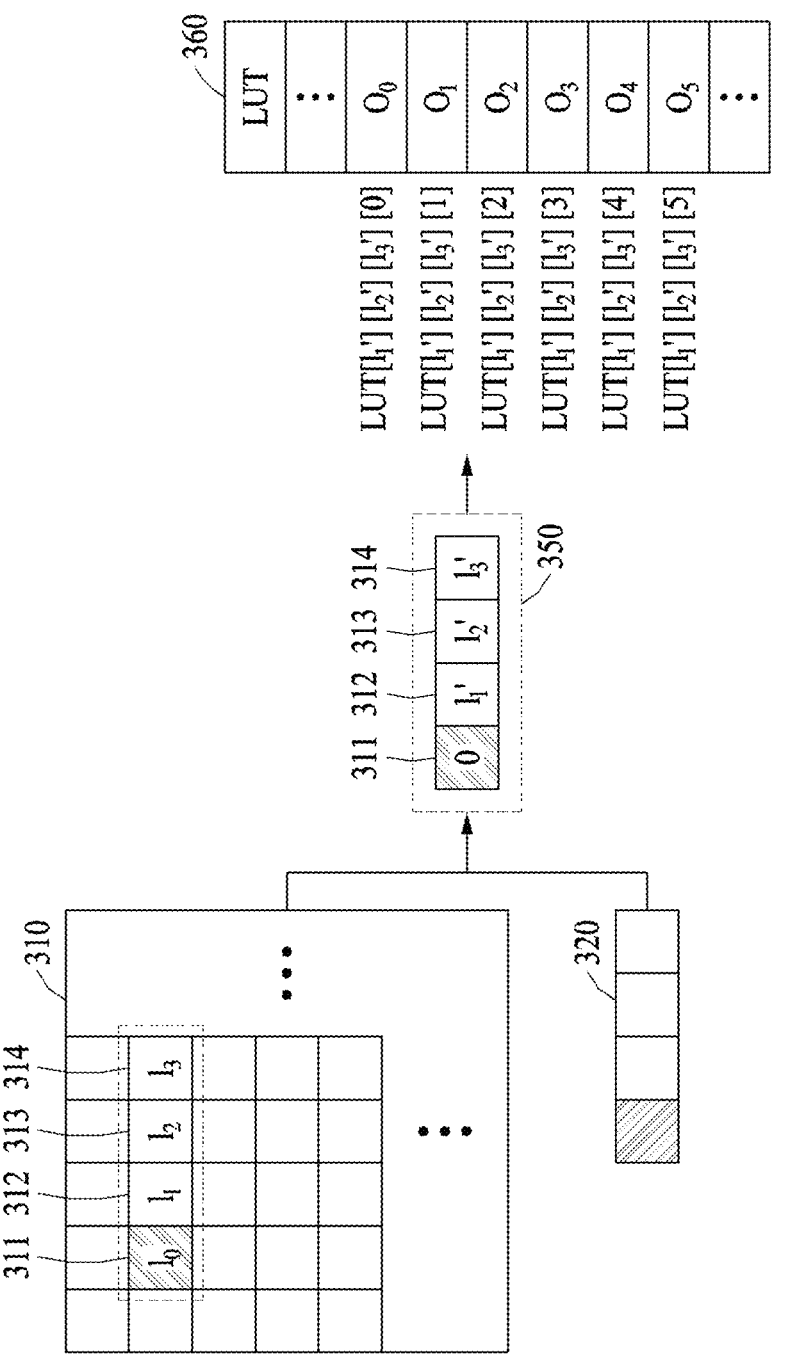

According to an example embodiment, the LUT may store SR operation results of combinations of (kernel size−1) pixels, excluding a reference pixel from the kernel size. For example, referring to FIG. 3B, values of pixels 311, 312, 313, and 314 included in a receptive field of an input image 310 corresponding to a kernel 320 may be updated based on a value of the reference pixel 311. The values of the pixels 311, 312, 313, and 314 included in the receptive field may be updated to values obtained by subtracting the value of the reference pixel 311 from respective original values of the pixels 311, 312, 313, and 314. Referring to an updated receptive field 350, the updated value of the reference pixel 311 may be zero (which is, $I_0-I-O=0$), the updated value of the pixel 312 may be $I'_1$ (which is, $I_1-I-O=I'_1$), the updated value of the pixel 313 may be $I'_2$ (which is, $I_2-I-O=I'_2$) and the updated value of the pixel 314 may be $I'_3$ (which is, $I_3-I-O=I'_3$). A LUT 360 may include SR operation results corresponding to combinations of three pixels excluding a reference pixel from the size (e.g., 4) of a kernel. For example, when the size of the kernel 320 is 4, and one pixel has an integer value greater than or equal to zero (0) and less than or equal to 255, the LUT 360 corresponding to the kernel 320 may include $256^3$ SR operation results corresponding to combinations of pixels values of three pixels.

According to an example embodiment, a LUT may store $r_1 \times r_2$ SR operation results for each pixel value combination of the size corresponding to a kernel, based on an upscaling multiple $r_1$ for the width and an upscaling multiple $r_2$ for the height. For example, referring to FIG. 3A, when the upscaling multiple for the width is 2 and the upscaling multiple for the height is 3, the LUT 330 may store six SR operation results $O_0$, $O_1$, $O_2$, $O_3$, $O_4$, and $O_5$ corresponding to a combination of four pixels $I_0$, $I_1$, $I_2$, and $I_3$ (corresponding to the size of the kernel 320).

For example, when the four pixels 311, 312, 313, and 314 included in the receptive field have respective values $I_0$, $I_1$, $I_2$, and $I_3$, six values (e.g., LUT $[I_0][I_1][I_2][I_3][O]=O_0$, LUT$[I_0][I_1][I_2][I_3][1]=O_1$, LUT$[I_0][I_1][I_2][I_3][2]=O_2$, LUT $[I_0][I_1][I_2][I_3][3]=O_3$, LUT$[I_0][I_1][I_2][I_3][4]=O_4$, and LUT $[I_0][I_1][I_2][I_3][5]=O_5$) stored in the LUT 330 corresponding to combinations of $I_0$, $I_1$, $I_2$, and $I_3$ may be determined as values of six pixels 341, 342, 343, 344, 345, and 346 of an SR image 340 corresponding to the reference pixel 311, respectively. The reference pixel 311 may be determined as any one of pixels included in the input image 310. The SR image 340 may correspond to an image including an SR operation result obtained from the LUT 330 by setting pixels included in the input image 310 as a reference pixel.

According to an example embodiment, $r_1 \times r_2$ pixel values of an SR image corresponding to a reference pixel of an input image may be determined, based on positions at which $r_1 \times r_2$ SR operation results are stored in a LUT. For example, referring to FIG. 3A, a value $O_0$ stored at a position LUT $[I_0][I_1][I_2][I_3][0]$ of the LUT 330 corresponding to a combination of four pixels $I_0$, $I_1$, $I_2$, and $I_3$ included in the receptive field of the reference pixel 311 may be determined as a value of the pixel 341 corresponding to a position $(0, 0)$ from among the six pixels 341, 342, 343, 344, 345, and 346 of the SR image 340 corresponding to the reference pixel 311. A value $O_1$ stored at a position LUT $[I_0][I_1][I_2][I_3][1]$ may be determined as a value of the pixel 342 corresponding to a position $(0, 1)$ from among the six pixels 341, 342, 343, 344, 345, and 346 of the SR image 340 corresponding to the reference pixel 311. A value $O_2$ stored at a position LUT $[I_0][I_1][I_2][I_3][2]$ may be determined as a value of the pixel 343 corresponding to a position $(1, 0)$ from among the six pixels 341, 342, 343, 344, 345, and 346 of the SR image 340 corresponding to the reference pixel 311. A value $O_3$ stored at a position LUT $[I_0][I_1][I_2][I_3]$ $[3]$ may be determined as a value of the pixel 344 corresponding to a position $(1, 1)$ among the six pixels 341, 342, 343, 344, 345, and 346 of the SR image 340 corresponding to the reference pixel 311. A value $O_4$ stored at a position LUT $[I_0][I_2][I_3][4]$ may be determined as a value of the pixel 345 corresponding to a position $(2, 0)$ among the six pixels 341, 342, 343, 344, 345, and 346 of the SR image 340 corresponding to the reference pixel 311. A value $O_5$ stored at a position $LUT[I_0][I_1][I_2]$ $[I_3][5]$ may be determined as a value of the pixel 346 corresponding to a position $(2, 1)$ among the six pixels 341, 342, 343, 344, 345, and 346 of the SR image 340 corresponding to the reference pixel 311.

According to an example embodiment, a LUT corresponding to a kernel may store an SR operation result for a combination of pixels corresponding to the size of the kernel size, and the SR operation result may be stored in divided LUTs—a LUT corresponding to a most significant bit (MSB) and a LUT corresponding to a least significant bit (LSB). For example, when one pixel has an integer value greater than or equal to zero (0) and less than or equal to $2^n$ (where n is a natural number greater than or equal to 1), a value of the pixel may be represented as n bits. The LUT corresponding to the MSB may store data corresponding to upper $n_1$ bits among n-bit pixel values, and the LUT corresponding to the LSB may store data corresponding to lower 4 bits among $n_2$-bit pixel values. In this example, $n_1$ and $n_2$ may be natural numbers smaller than n satisfying a condition that $n1+n2=n$. For example, when $r_1 \times r_2$ SR operation results having pixel values represented by 8 bits are stored in a LUT corresponding to each combination of four pixels represented by 8 bit, the LUT corresponding to the MSB may store values corresponding to upper 4 bits of the $r_1 \times r_2$ SR operation results corresponding to combinations of upper 4 bits of the pixel values of the four pixels, and the LUT corresponding to the LSB may store values corresponding to lower 4 bits of the $r_1 \times r_2$ SR operation results corresponding to combinations of the lower 4 bits of the pixel values of the four pixels.

A final pixel value of the SR image may be determined by a combination of a result of the LUT corresponding to the MSB and a result of the LUT corresponding to the LSB. For example, when a value of a specific pixel of an SR image obtained based on the LUT corresponding to the MSB is 0101 and a value of the pixel obtained based on the LUT corresponding to the LSB is 0001, a final value of the pixel may be 01010001, having 0101 as four upper bit values and 0001 as four lower bit values.

According to an example embodiment, the LUT may include an SR operation result corresponding to each of kernels included in kernel sets mapped to preset direction types. For example, referring to FIG. 2, the LUT may include an SR operation result corresponding to each of 16 kernels included in kernel sets 210, 220, 230, and 240. The LUT may include a LUT corresponding to each kernel. For example, an SR operation result of a reference pixel for a combination of four pixels stored in a LUT corresponding to a first kernel and an SR operation result of a reference pixel for a combination of four pixels stored in a LUT corresponding to a second kernel may be different from each other.

According to an example embodiment, the number of direction types may be changed according to settings. For example, the number of direction types may be set to a value greater than or equal to 1. As the number of direction types is set to a greater value, the size of the LUT may increase because the number of kernels corresponding to the direction types increases. As the number of direction types is set to a greater value, an SR performance may be improved. For example, the number of direction types may be a value determined independently of an upscaling multiple. For example, the number of direction types may be a value determined independently of the size of a kernel.

According to an example embodiment, a process of obtaining an SR operation result corresponding to each pixel of an input image from a LUT in which an SR operation result of a combination of pixel values corresponding to a kernel of the input image is stored may be referred to herein as a LUT process. The kernel of the input image may include a kernel included in a kernel set mapped to a direction type determined in operation 110 described above.

According to an example embodiment, when the LUT process is performed on an input image, a first intermediate image may be obtained. The first intermediate image may correspond to an output result of an SR model for the input image. Using an operation result stored in the LUT without performing an operation of the SR model on an image to obtain a first intermediate image may save time and resources used for the operation.

According to an example embodiment, when a plurality of kernels is included in a kernel set mapped to a direction type of an input image, a first intermediate image may be obtained based on a sum of SR operation results for the kernels. An SR operation result for each kernel may be obtained from a LUT for each of kernels included in each of kernel sets. For example, when a plurality of kernels is included in a kernel set, a value obtained by simply adding SR operation results for the kernels may be determined as a pixel value of a first intermediate image. For example, when a plurality of kernels is included in a kernel set, an average value of SR operation results for the kernels may be determined as a pixel value of a first intermediate image.

According to an example embodiment, operation 120 may include extracting a non-flat region from an input image based on a gradient of the input image and obtaining a first intermediate image corresponding to the non-flat region based on a value stored in a LUT corresponding to the non-flat region of the input image. A method of obtaining a first intermediate image corresponding to a non-flat region is described in detail with reference to FIG. 4.

The SR method according to an example embodiment may include an operation of performing a preprocessing process on the input image before operation 120. For example, the input image may be input to a convolutional neural network (CNN)-based model for preprocessing, and a preprocessed image in which pixel values are adjusted may be obtained. As the LUT process is performed on the preprocessed image, the first intermediate image may be obtained. The preprocessing of the input image may improve an image quality of an SR image or SR performance.

The SR method according to an example embodiment may include operation 130 of obtaining an output image based on the first intermediate image and a baseline image obtained by applying interpolation for SR to the input image.

According to an example embodiment, operation 130 may include obtaining the baseline image by applying interpolation for SR to the input image. The baseline image may correspond to an SR image of the input image that is obtained by the interpolation for SR. The interpolation for SR, which is a method of estimating a value of a new pixel included in the SR image by using a function derived from positions and values of pixels of the input image, may include, for example, linear interpolation, bilinear interpolation, nearest interpolation, bicubic interpolation, inverse distance weighted (IDW) interpolation, and Kriging interpolation. For example, the baseline image may correspond to an SR image obtained by upscaling the input image by a preset multiple.

According to an example embodiment, operation 130 of obtaining the output image may include obtaining the output image based on a sum of a pixel value of the baseline image and a pixel value of the first intermediate image. By adding, to the baseline image obtained through the interpolation, the first intermediate image which is an operation result of an SR model, an SR image with the improved image quality may be obtained.

Operation 130 of obtaining the output image may include obtaining an intermediate output image based on the baseline image and the first intermediate image, obtaining a second intermediate image by applying the input image to a neural network for SR (hereinafter, an SR neural network), and obtaining the output image based on the second intermediate image and the intermediate output image. A method of obtaining an output image based on an SR neural network will be described in detail with reference to FIG. 5.

According to an example embodiment, the input image may include an image of a single frame. When the input image is an image of a single frame, operations 110 to 130 may be performed on the single frame. In this case, an SR image corresponding to the single frame may be obtained as the output image.

According to an example embodiment, the input image may include a video image including a plurality of frames. When the input image is a video image, operations 110 to 130 may be performed on each of the frames included in the input image. In this case, a plurality of SR images corresponding to the frames may be obtained as the output image.

Figure 4:
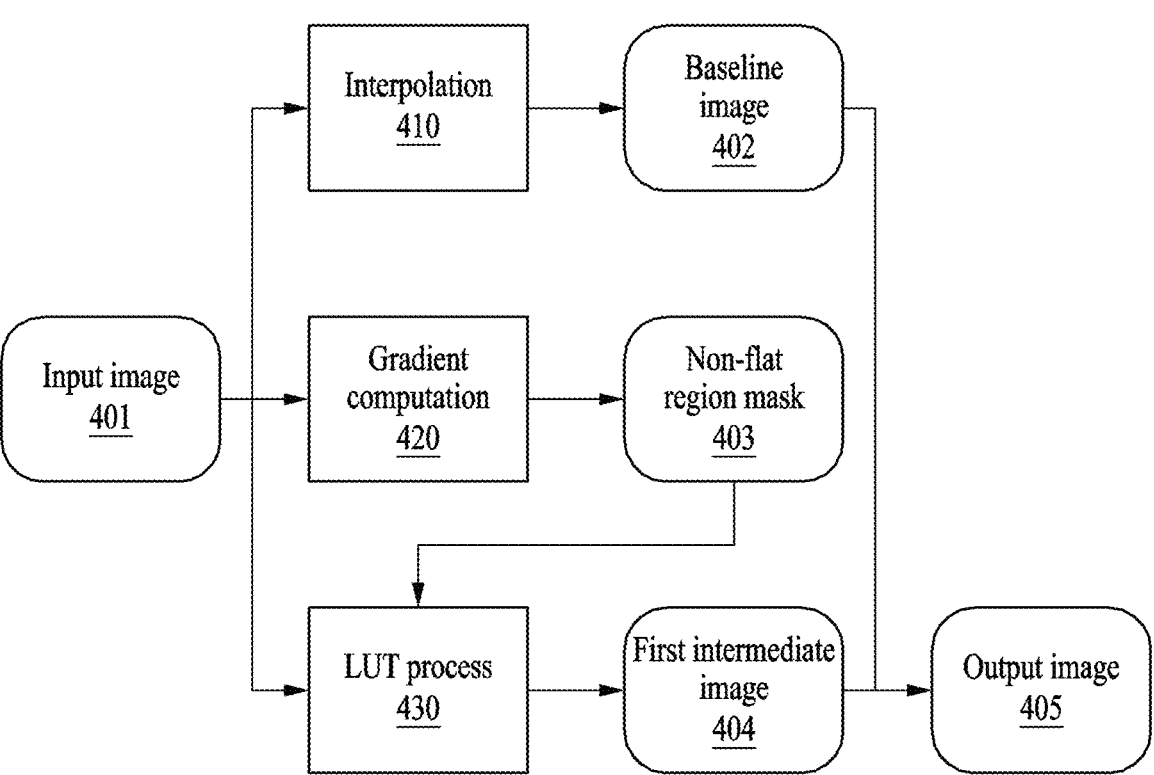
FIG. 4 is a diagram illustrating an example framework of an SR method according to an example embodiment.

FIG. 4 is a diagram illustrating an example framework of an SR method according to an example embodiment. Referring to FIG. 4, an SR method according to an example embodiment may include an interpolation process 410 of obtaining a baseline image 402 by applying interpolation for SR to an input image 401.

The SR method may include a gradient computation process 420. For example, the gradient computation process 420 may include calculating (or computing) the angle of a gradient of the input image 401. The angle of the gradient may be calculated as represented by Equation 2. For example, the gradient computation process 420 may include calculating the size of the gradient of the input image 401.

The gradient computation process 420 may include obtaining a non-flat region mask 403 based on the gradient of the input image 401. The non-flat region mask 403 may correspond to a mask indicating a non-flat region in input image 401. The non-flat region may be determined based on the size of the gradient. The size of the gradient, which is a value indicating a degree of difference or a variation in pixel values, may be represented by Equation 3 below.

$$G=\sqrt{G_x^2+G_y^2} \qquad \text{[Equation 3]}$$

In Equation 3, $G_x$ and $G_y$ may correspond to $G_x$ and $G_y$ of Equation 1 above.

For example, the non-flat region may be a region including pixels having a relatively high gradient among pixels included in the input image 401. For example, the non-flat region may be a region including pixels having the size of the gradient that is greater than or equal to a threshold value.

The SR method according to an example embodiment may include a LUT process 430. The LUT process 430 may include obtaining an SR operation result corresponding to pixels included in the non-flat region of the input image 401 from a LUT, based on the non-flat region mask 403 determined based on the size of the gradient of the input image 401.

The LUT process 430 may include obtaining an SR operation result of the input image 401 from the LUT corresponding to a kernel included in a kernel set mapped to a direction type, based on the direction type of the input image 401 determined based on the angle of the gradient of the input image 401.

A first intermediate image 404 may be obtained as the result of the LUT process 430 for the input image 401. The first intermediate image 404 may include the SR operation result of the pixels corresponding to the non-flat region. For example, the first intermediate image 404 may correspond to an SR image obtained by upscaling the input image 401 by a preset multiple. The first intermediate image 404 may be the SR image having the same size as the baseline image 402.

The LUT process 430 may include setting, a default value (e.g., zero (0)), pixel values of the first intermediate image 404 corresponding to pixels of the input image 401 that is not included in the non-flat region based on the non-flat region mask 403. The pixels of the input image 401 that are not included in the non-flat region may include pixels in the input image 401 excluding pixels indicated by the non-flat region mask 403 as the non-flat region.

An output image 405 may be obtained based on the first intermediate image 404 and the baseline image 402 obtained by applying the interpolation for SR to the input image 401. As described above regarding operation 130 of FIG. 1, the output image 405 may be obtained by adding, to the baseline image 402, the first intermediate image 404 that is an operation result of the SR model. For example, a value of a pixel that does not correspond to a non-flat region in the output image 405 may be determined by a value of a pixel of the baseline image 402.

Accordingly, an embodiment includes obtaining an input image including a first part and a second part; computing a first gradient for the first part and a second gradient for the second part based on the input image; obtaining a first kernel shape for the first part and a second kernel shape for the second part based on the first gradient and the second gradient, respectively, wherein the first kernel shape and the second kernel shape are obtained from a LUT and wherein the second kernel shape is different from the first kernel shape; and generating an output image by performing SR and the input image based on the first kernel shape and the second kernel shape.

Figure 5:
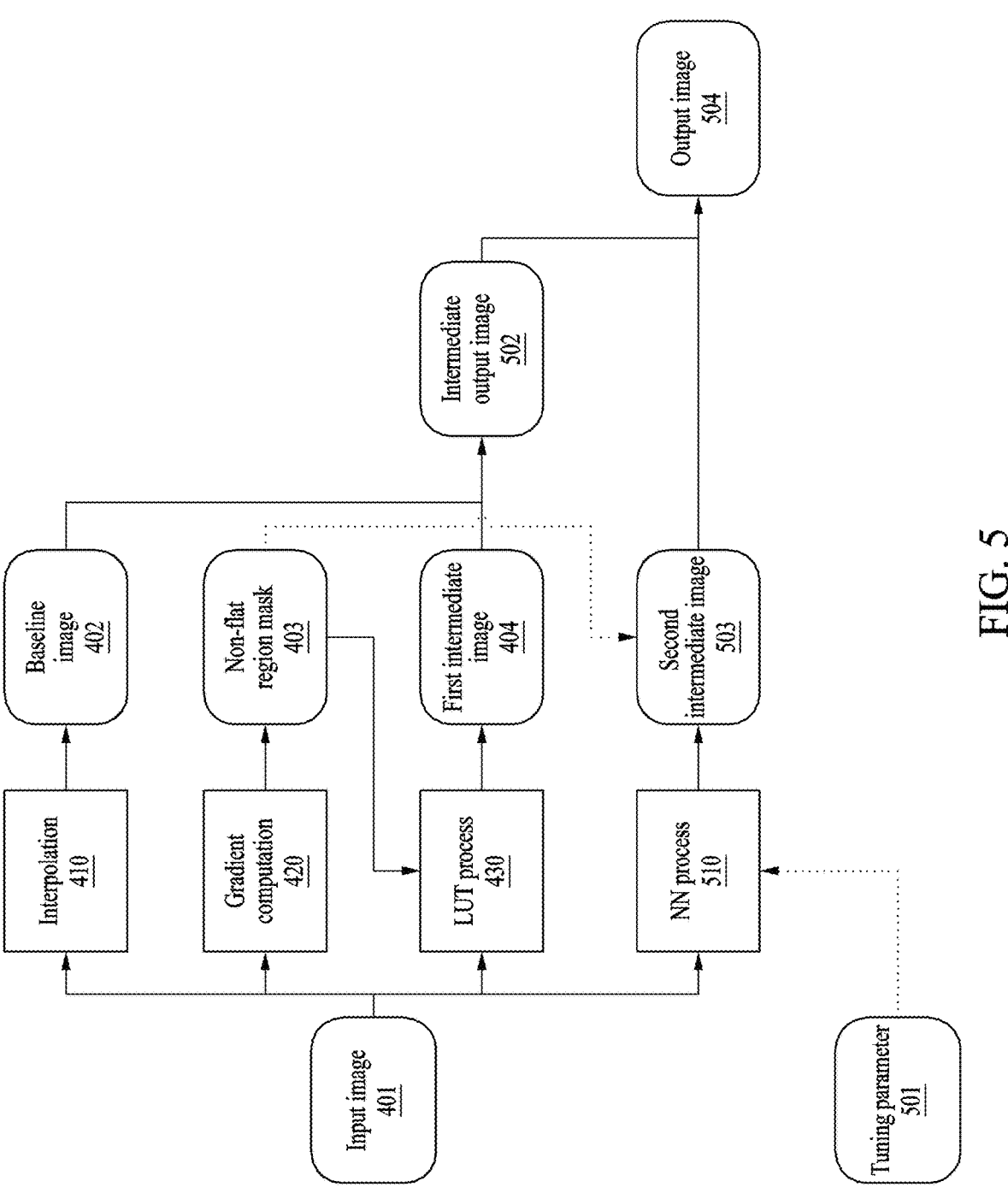
FIG. 5 is a diagram illustrating an example framework of an SR method including a neural network (NN) process according to an example embodiment.

FIG. 5 is a diagram illustrating an example framework of an SR method including a neural network (NN) process according to an example embodiment. Referring to FIG. 5, an SR method according to an example embodiment may include an interpolation process 410 of obtaining a baseline image 402 by applying interpolation for SR to an input image 401. The interpolation process 410 of FIG. 5 may correspond to the interpolation process 410 of FIG. 4.

The SR method may include a gradient computation process 420. The gradient computation process 420 of FIG. 5 may correspond to the gradient computation process 420 of FIG. 4. The SR method may include a LUT process 430. The LUT process 430 of FIG. 5 may correspond to the LUT process 430 of FIG. 4 and a LUT process 430 of FIG. 7.

The SR method may include obtaining an intermediate output image 502 based on the baseline image 402 and a first intermediate image 404. The intermediate output image 502 of FIG. 5 may correspond to the output image 405 of FIG. 4.

Example SR methods may include a NN process 510. The NN process 510 may include obtaining a second intermediate image 503 by applying the input image 401 to an SR neural network. The SR neural network may be a network trained to output an SR image corresponding to an input image and may include, for example, a CNN including one or more convolution layers.

A CNN may be an example of an artificial neural network. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some cases, the neural network is trained using supervised learning. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (e.g., a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

In some examples, training data may include LR and corresponding HR images. For example, the LR images may be obtained by down-sampling HR images. Then the neural network may perform an SR technique, and the predict5ed SR image can be compared against a ground-truth HR image.

The SR neural network may receive a tuning parameter 501 together with the input image 401. The tuning parameter 501, which is a parameter for image processing, may include at least one of, for example, a value indicating a noise level of the input image 401, a blurring kernel of the input image 401, or a standard deviation of a Gaussian kernel for blurring the input image 401.

The SR neural network may include a neural network trained to output an SR image of a high resolution based on a low-resolution image and the tuning parameter 501 corresponding to the low-resolution image. For example, the tuning parameter 501 may include various types of degradation values. The SR neural network may be trained to output an SR image of a composite degraded image based on the tuning parameter 501. For example, when the tuning parameter 501 is a noise level, the SR neural network may be trained to output an SR image of which a noise removal degree is determined according to the noise level. For example, when the tuning parameter 501 is a blurring kernel, the SR neural network may be trained to output an SR image obtained through deblurring performed based on the blurring kernel.

The second intermediate image 503 may be obtained as the result of the NN process 510 for the input image 401. The second intermediate image 503 may include an operation result of the SR neural network for of the input image 401. For example, the second intermediate image 503 may correspond to an SR image obtained by upscaling the input image 401 by a preset multiple. The second intermediate image 503 may be an SR image having the same size as the first intermediate image 404 and the baseline image 402.

The SR method may include obtaining an output image 504 based on the second intermediate image 503 and the intermediate output image 502. For example, a pixel value of the output image 504 may be a sum of a pixel value of the second intermediate image 503 and a pixel value of the intermediate output image 502. For example, the pixel value of the output image 504 may be determined as an average of the pixel value of the second intermediate image 503 and the pixel value of the intermediate output image 502.

To obtain the output image 504, the SR method may include obtaining the output image 504 based on the second intermediate image 503 corresponding to the non-flat region of the input image 401 and on the intermediate output image 502. As described above, the non-flat region of the input image 401 may include at least a portion of the input image 401 extracted based on the gradient of the input image 401.

According to an example embodiment, the second intermediate image 503 corresponding to the non-flat region may be obtained based on the non-flat region mask 403 indicating the non-flat region of the input image 401. The second intermediate image 503 corresponding to the non-flat region may include an output of the SR neural network corresponding to pixels of the input image 401 included in the non-flat region indicated by the non-flat region mask 403. Pixel values of the second intermediate image 503 corresponding to pixels of the input image 401 that are not included in the non-flat region may be a default value (e.g., zero (0)). The pixels of the input image 401 that are not included in the non-flat region may include pixels in the input image 401, excluding the pixels indicated by the non-flat region mask 403 as the non-flat region. A value of a pixel that does not correspond to the non-flat region in the output image 504 may be determined by a pixel value of the intermediate output image 502.

According to an example embodiment, the input image 401 may include an image of a single frame.

According to an example embodiment, the input image 401 may include a video image including a plurality of frames. When the input image 401 is a video image, the SR neural network may further include a multi-frame processing module. The multi-frame processing module may extract spatial and temporal features from a plurality of frames included in input image 401. In this case, the SR neural network may be trained to output an SR image of each of the frames based on the spatial and temporal features extracted from the multi-frame processing module.

According to an example embodiment, the intermediate output image 502 and the output image 504 may be used as outputs for different purposes. For example, the different purposes may be distinguished based on the accuracy and/or speed required for an SR operation result.

According to an example embodiment, the intermediate output image 502 may be used when a fast output of an SR operation result is more required than a highly accurate output of the SR operation result. For example, the SR method may include outputting in real time the intermediate output image 502 through a camera preview. The camera preview that outputs an image received through a camera may correspond to a screen that outputs the received image in real time, and thus the intermediate output image 502 may be used as an image output to the camera preview.

According to an example embodiment, the output image 504 obtained by applying an output result of the SR neural network may be used when a highly accurate output of an SR operation result is more required than a fast output of the SR operation result. The time used to obtain the intermediate output image 502 according to the LUT process 430 may be less than the time used to obtain the output image 504, including the NN process 510. However, the output image 504 obtained by applying the output result of the SR neural network may be an image having a higher accuracy of an SR operation or be an image with an improved image quality, compared to the intermediate output image 502 to which the output result of the SR neural network is not applied. Accordingly, the output image 504 may be used when not using an accelerated SR operation or when outputting an accurate SR image is more desired. For example, the SR method may include providing the output image 504 as a captured image of the input image 401.

Figure 6:
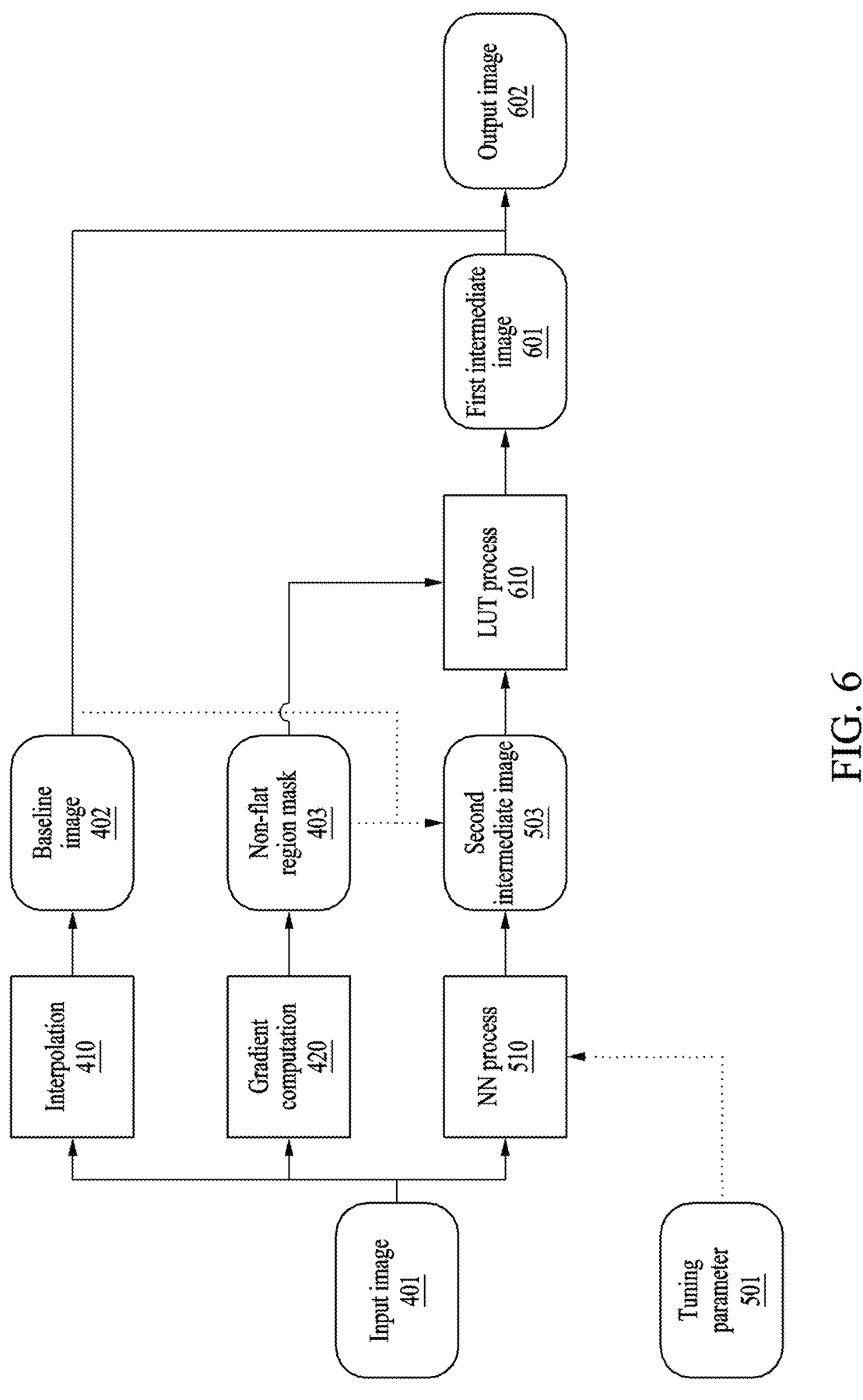
FIG. 6 is a diagram illustrating an example framework of an SR method in which a NN process and a LUT process are performed in series according to an example embodiment.

FIG. 6 is a diagram illustrating an example framework of an SR method in which a NN process and a LUT process are performed in series according to an example embodiment.

Referring to FIG. 6, an SR method according to an example embodiment may include an interpolation process 410 of obtaining a baseline image 402 by applying interpolation for SR to an input image 401. The interpolation process 410 of FIG. 6 may correspond to the interpolation process 410 of FIG. 4 and the interpolation process 410 of FIG. 5.

The SR method may include a gradient computation process 420. The gradient computation process 420 of FIG. 6 may correspond to the gradient computation process 420 of FIG. 4 and the gradient computation process 420 of FIG. 5. The SR method may include a NN process 510. The NN process 510 of FIG. 6 may correspond to the NN process 510 of FIG. 5. However, FIG. 6 shows an example framework in which the NN process 510 and the LUT process 610 are performed in series.

Referring to FIG. 6, the SR method may include obtaining a second intermediate image 503 by applying the input image 401 to an SR neural network to obtain a first intermediate image 601. For example, the obtaining of the second intermediate image 503 may include obtaining the second intermediate image 503 based on a sum of an output of the SR neural network and a baseline image 402.

According to an example embodiment, the second intermediate image 503 corresponding to a non-flat region may be obtained based on a non-flat region mask 403 indicating the non-flat region of the input image 401. As described above, the second intermediate image 503 corresponding to the non-flat region may include an output of the SR neural network corresponding to pixels included in the non-flat region indicated by the non-flat region mask 403.

The SR method may include the LUT process 610. The LUT process 610 may include obtaining the first intermediate image 601 which is a corrected SR image corresponding to the second intermediate image 503, based on a LUT in which an SR correction result of a pixel value combination corresponding to a kernel set mapped to a direction type determined to obtain the first intermediate image 601 is stored.

Hereinafter, a LUT storing an SR operation result of a pixel value combination corresponding to a kernel set described above with reference to FIGS. 1 through 5 will be referred to as a first LUT, and a LUT storing an SR correction result of the pixel value combination corresponding to the kernel set will be referred to as a second LUT.

According to an example embodiment, the second LUT may correspond to a data structure in which an SR correction result of an SR correction model is stored. The SR correction model may be a model trained to output a corrected SR image from an SR image of an input image input to the SR correction model before correction. The SR image of the input image before correction may include an SR image obtained by various SR models or SR algorithms.

According to an example embodiment, an SR correction result corresponding to a specific pixel of the SR image before correction may be determined by a pixel value in a receptive field of the SR image before correction according to a kernel. The second LUT may store an SR operation result using the SR correction model for a combination of all pixels corresponding to the receptive field. The SR correction result may include a pixel value of the corrected SR image mapped to each of pixel value combinations corresponding to the size of the kernel.

According to an example embodiment, unlike the first LUT that stores $r^2$ SR operation results for each pixel value combination of the size of a kernel based on an up scaling multiple r, the second LUT may store one SR correction result for each pixel value combination of the size corresponding to the kernel. One pixel value corresponding to a reference pixel may be obtained from the second LUT. The size of the second intermediate image 503 and the size of the first intermediate image 601 obtained as the second intermediate image 503 is corrected by the LUT process 610 may be the same.

According to an example embodiment, the LUT process 610 may include obtaining an SR correction result corresponding to a pixel included in the non-flat region of the second intermediate image 503 from the second LUT, based on the non-flat region mask 403 determined based on the size of a gradient. For example, a pixel value of the first intermediate image 601 corresponding to a pixel of the second intermediate image 503 that is not included in the non-flat region may be a default value (e.g., zero (0)).

The SR method may include obtaining an output image 602 based on the first intermediate image 601 and the baseline image 402. For example, a pixel value of the output image 602 may be determined as a sum of pixel values of the first intermediate image 601 and the baseline image 402. For example, the pixel value of the output image 602 may be determined as an average of the pixel values of the first intermediate image 601 and the baseline image 402.

Figure 7:
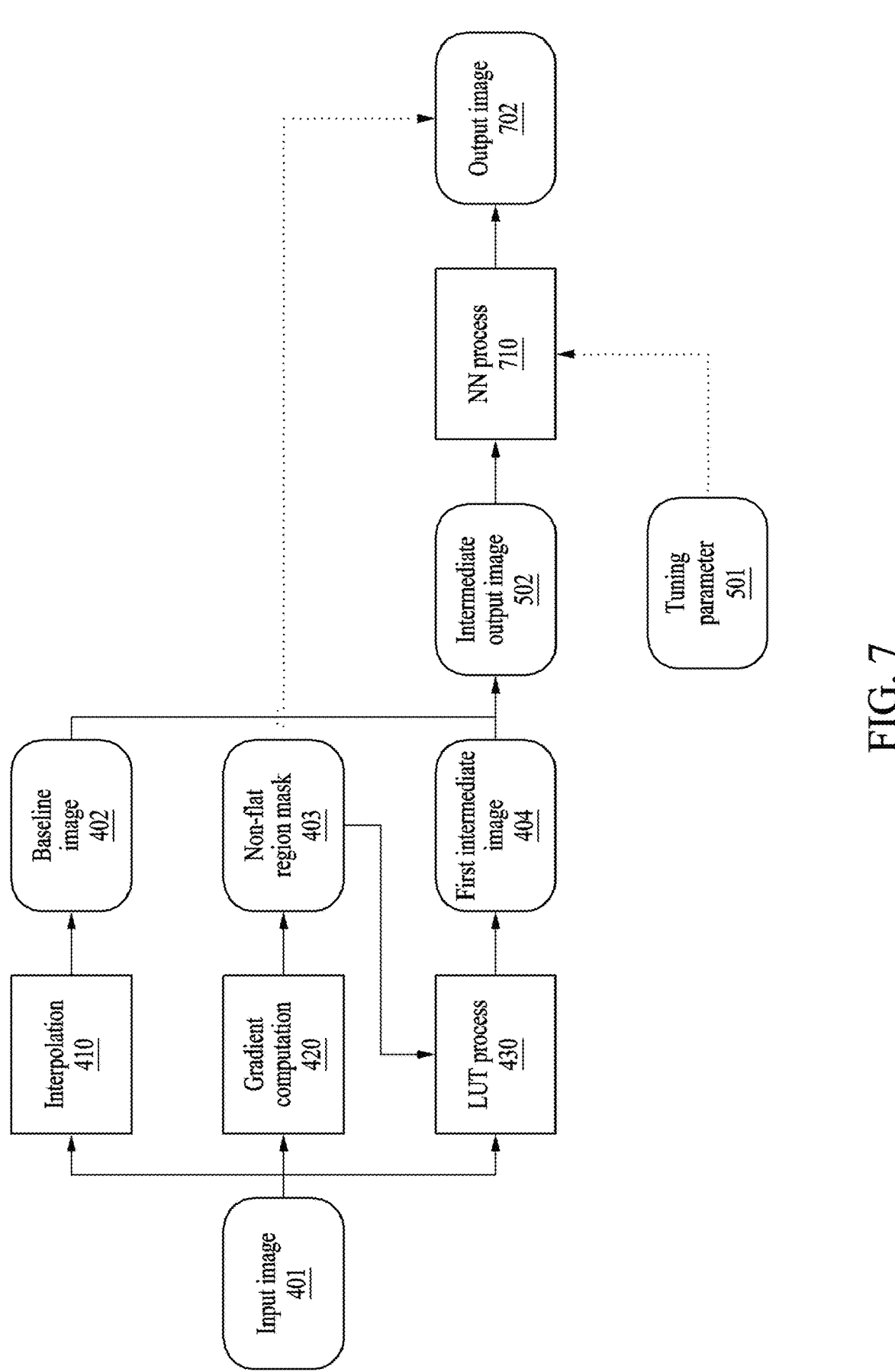
FIG. 7 is a diagram illustrating an example framework of an SR method in which a NN process and a LUT process are performed in series according to an example embodiment.

FIG. 7 is a diagram illustrating an example framework of an SR method in which a NN process and a LUT process are performed in series according to an example embodiment.

Referring to FIG. 7, an SR method according to an example embodiment may include an interpolation process 410 of obtaining a baseline image 402 by applying interpolation for SR to an input image 401. The interpolation process 410 of FIG. 7 may correspond to the interpolation process 410 of FIG. 4, the interpolation process 410 of FIG. 5, and the interpolation process 410 of FIG. 6.

The SR method may include a gradient computation process 420. The gradient computation process 420 of FIG. 7 may correspond to the gradient computation process 420 of FIG. 4, the gradient computation process 420 of FIG. 5, and the gradient computation process 420 of FIG. 6.

The SR method may include a LUT process 430. The LUT process 430 of FIG. 7 may correspond to the LUT process 430 of FIG. 4. An intermediate output image 502 of FIG. 7 may correspond to the output image 405 of FIG. 4 and the intermediate output image 502 of FIG. 5. However, FIG. 7 shows an example framework in which a NN process 710 and the LUT process 430 are performed in series.

FIG. 7 shows an example framework in which the NN process 710 is performed after the LUT process 430 is first performed. Referring to FIG. 7, the SR method may include obtaining the intermediate output image 502 based on the baseline image 402 and a first intermediate image 404 to obtain an output image 702.

To obtain the output image 702, the SR method may include the NN process 710 of obtaining the output image 702 by applying the intermediate output image 502 to a neural network for SR correction (hereinafter, an SR correction neural network). The SR correction neural network may include a neural network trained to correct an SR image.

The SR correction neural network may receive a tuning parameter 501 together with an image which is a target to be corrected. The tuning parameter 501 may correspond to the tuning parameter 501 of FIG. 5 and the tuning parameter 501 of FIG. 6.

The output image 702 corresponding to a non-flat region may be obtained based on a non-flat region mask 403 indicating the non-flat region of the input image 401. The output image 702 corresponding to the non-flat region may include an output of the SR correction neural network corresponding to a pixel of the intermediate output image 502 included in the non-flat region indicated by the non-flat region mask 403. A pixel value of the output image 702 corresponding to a pixel of the intermediate output image 502 that is not included in the non-flat region may be determined to be the same as that of the intermediate output image 502.

Figure 8:
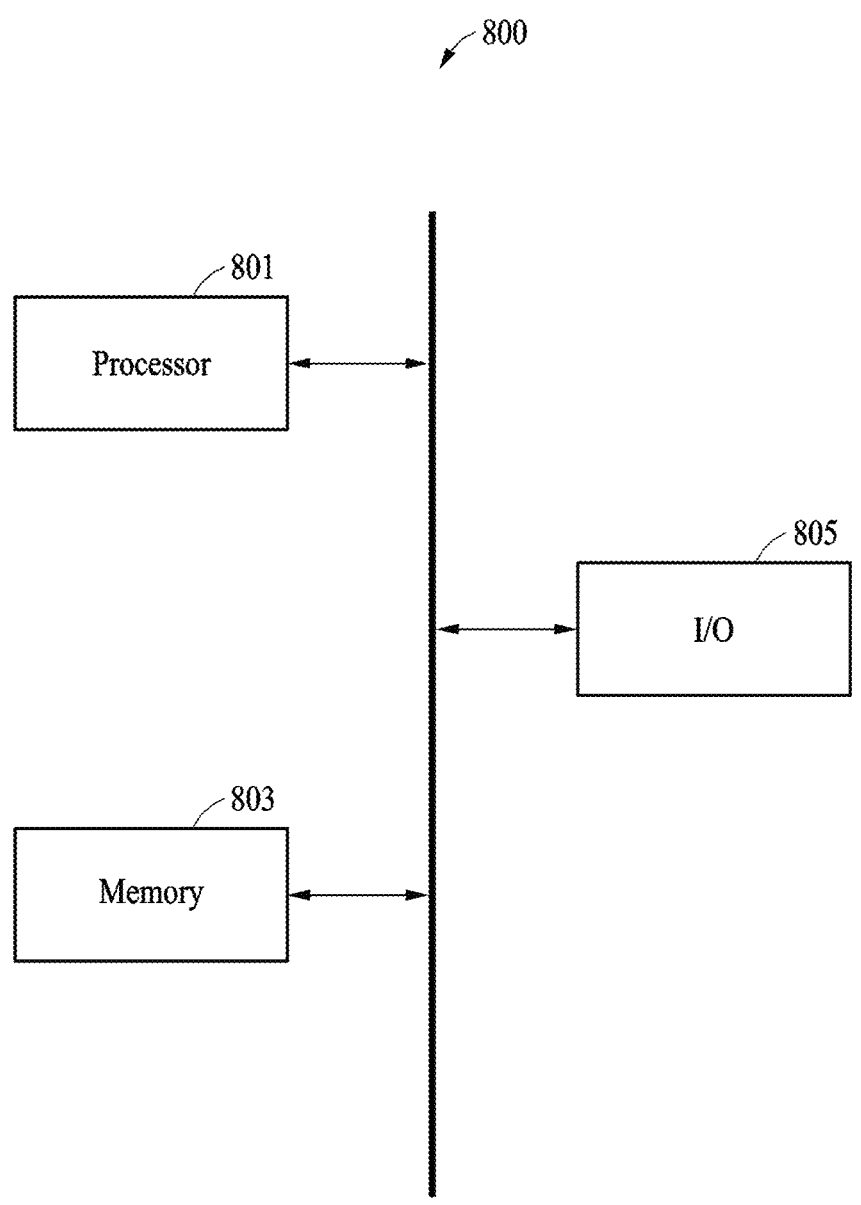
FIG. 8 is a diagram illustrating an example configuration of an apparatus according to an example embodiment.

FIG. 8 is a diagram illustrating an example configuration of an apparatus according to an example embodiment.

Referring to FIG. 8, an apparatus 800 according to an example embodiment may include a processor 801, a memory 803, and an input and output (I/O) device 805. The apparatus 800 may include an apparatus performing the SR method described above with reference to FIGS. 1 through 7.

A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

The processor 801 may perform at least one of the operations described above with reference to FIGS. 1 through 7. For example, the processor 801 may perform at least one operation among operation 110 of determining a direction type of an input image based on a gradient of the input image, operation 120 of obtaining a first intermediate image which is an SR image corresponding to the input image based on a LUT in which an SR operation result of a pixel value combination corresponding to a kernel set mapped to the determined direction type is stored, and operation 130 of obtaining an output image based on a baseline image obtained by applying interpolation for SR to the input image and on the first intermediate image, as described above with reference to FIG. 1.

The memory 803 may be a non-transitory computer-readable storage medium such as a volatile or nonvolatile memory and may store data related to the SR method described above with reference to FIGS. 1 through 7. For example, the memory 803 may store data generated during the execution of the SR method or data required to execute the SR method. For example, the memory 803 may store the LUT for obtaining SR operation results. For example, the memory 803 may store data (e.g., a baseline image and a non-flat region mask) generated during the execution of the SR method.

Examples of a memory device include random access memory (RAM) and read-only memory (ROM) devices. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

The I/O device 805 may include an input device configured to receive an input image and an output device configured to output a result image which is an SR operation result obtained by performing an SR operation on the input image. The input device may include, for example, an image sensor, a camera, or the like. The output device may include, for example, a display. For example, the I/O device 805 may include an I/O interface which is for an interface with a communication module of the apparatus 800 that provides a function for communicating with another electronic device or another server. In this example, the input image may be received from another device through an input interface, and the output image may be transmitted to another device through an output interface.

The memory 803 may store a program implementing the SR method described herein with reference to FIGS. 1 through 7. The processor 801 may execute the program stored in the memory 803 and control the apparatus 800. Codes of the program executed by the processor 801 may be stored in the memory 803.

The apparatus 800 may further include other components not shown in the accompanying drawings. For example, the apparatus 800 may further include a communication module that provides a function for the apparatus 800 to communicate with another electronic device or another server over a network. For another example, the apparatus 800 may further other components, such as, for example, a transceiver, various sensors, and a database (DB).

Figure 9:
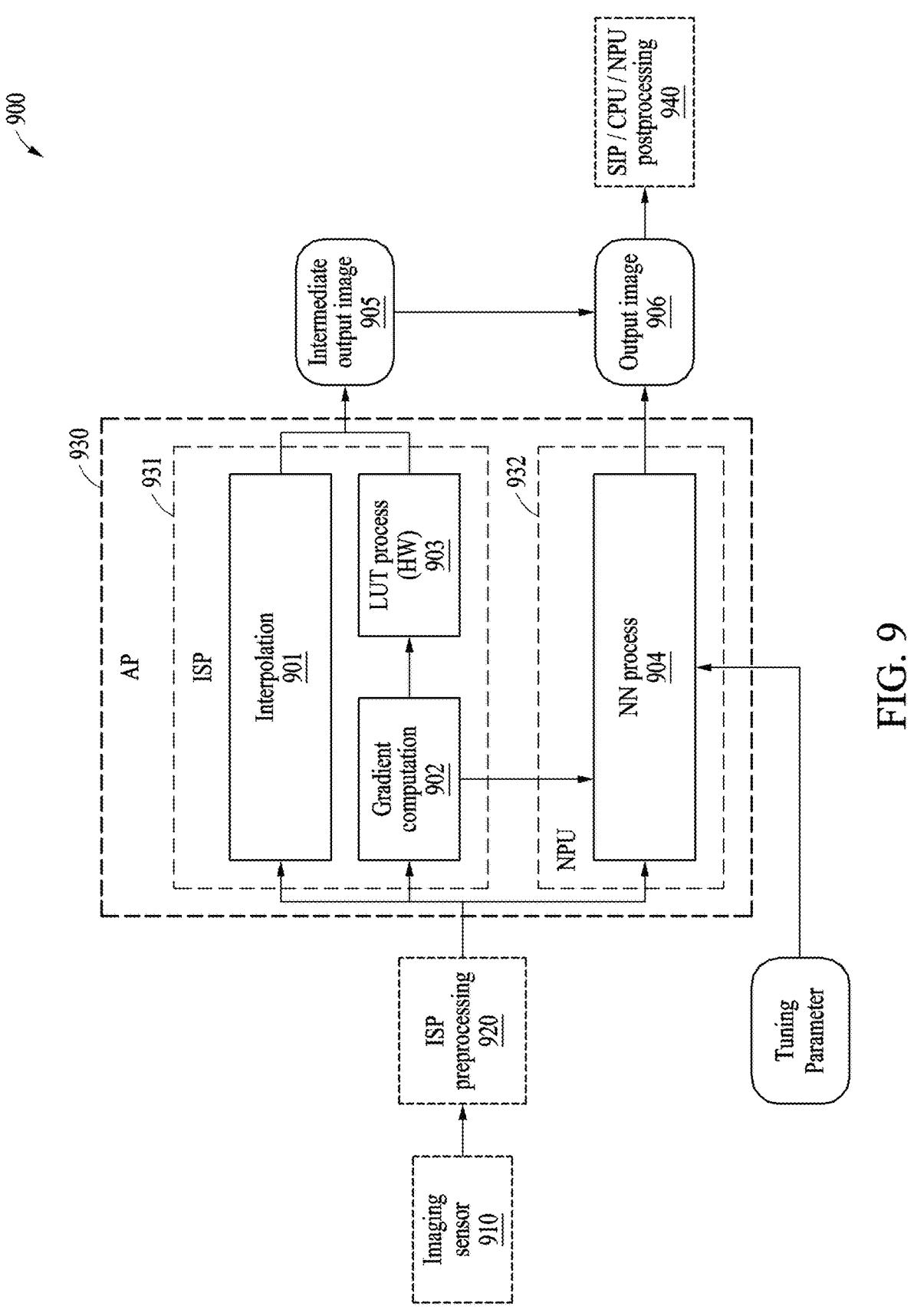
FIG. 9 is a diagram illustrating a detailed example configuration of an apparatus performing an SR method according to an example embodiment.

FIG. 9 is a diagram illustrating a detailed example configuration of an apparatus performing an SR method according to an example embodiment.

Referring to FIG. 9, an apparatus 900 according to an example embodiment may include an imaging sensor 910, an ISP preprocessing module 920, an application processor (AP) 930, and a postprocessing module 940. For example, the apparatus 900 may include various devices for image processing, such as, for example, a smartphone, a camera, a medical imaging device, a virtual reality (VR) device, and a semiconductor image measuring device.

The AP 930 may correspond to a processing device including at least one processor. The AP 930 may include a processor that processes at least one operation included in the SR method described above with reference to FIGS. 1 through 7. For example, at least one operation included in the SR method processed by the AP 930 may include an interpolation process 901, a gradient computation process 902, a LUT process 903, and a NN process 904.

According to an example embodiment, in a preview image output scenario for which a high processing speed needs to be guaranteed, an intermediate output image 905 obtained as an input image passes through an ISP 931 may be output. An operation performed by the ISP 931 may correspond to an operation with a low processing load. For example, the operation performed by the ISP 931 may include the interpolation process 901, the gradient computation process 902, and the LUT process 903.

According to an example embodiment, in a captured image and/or video output scenario, an output image 906 may be obtained additionally through the NN process 904. For example, in a case of the video output scenario in which a processing time is more important than the captured image scenario, a CNN including a relatively smaller number of layers, compared to the captured image output scenario, may be used as a neural network for the NN process 904. However, in the case of the captured image output scenario in which an image quality is more important than the processing time, a CNN including a relatively greater number of layers, compared to the video output scenario, may be used as a neural network for the NN process 904.

Figure 10A:
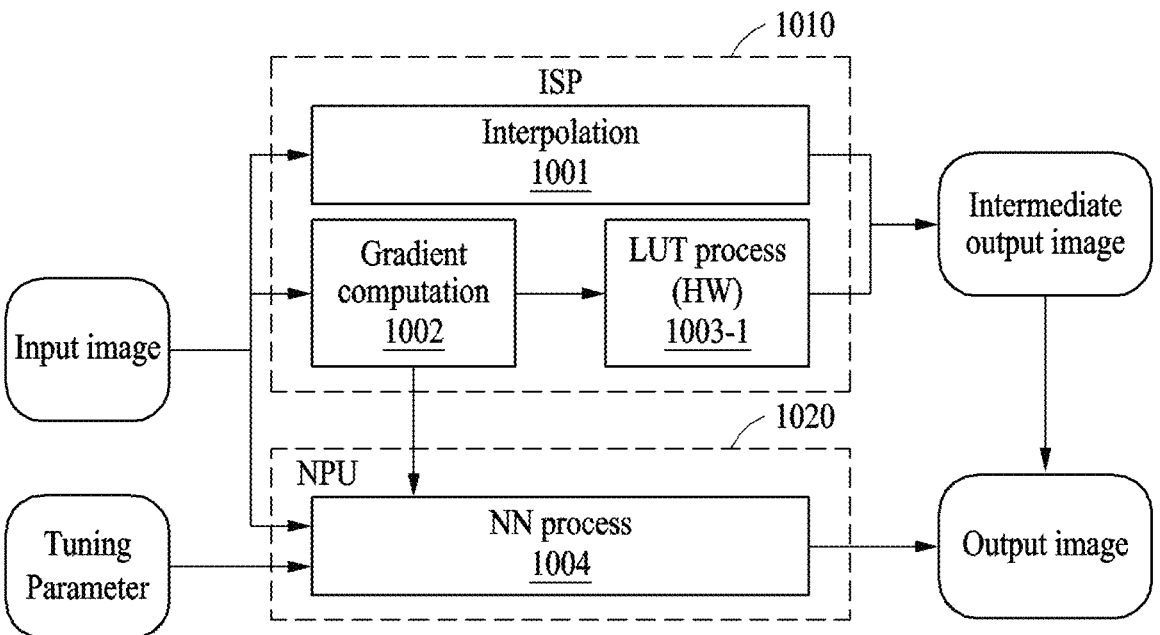
FIGS. 10A through 10C are diagrams illustrating examples of a hardware processing path of an SR method according to an example embodiment.
Figure 10B:
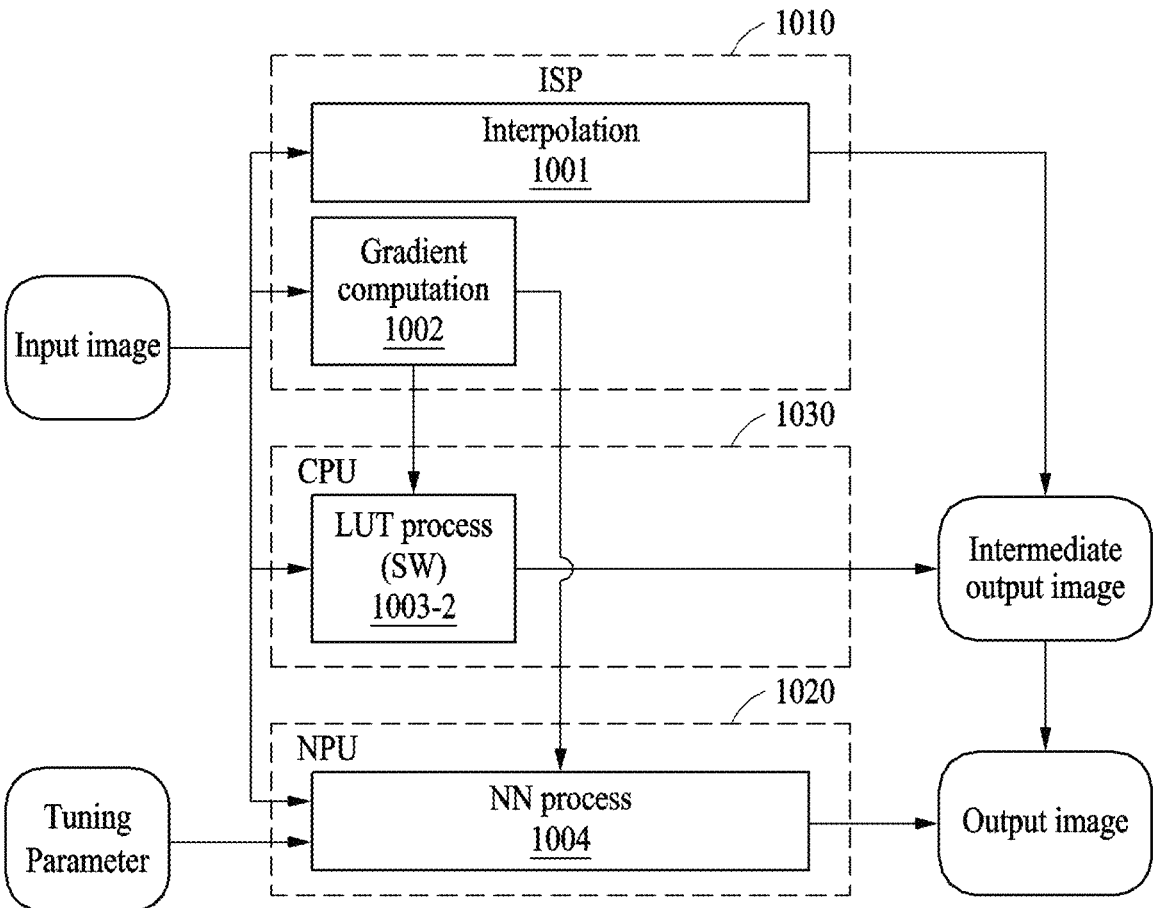
Figure 10C:
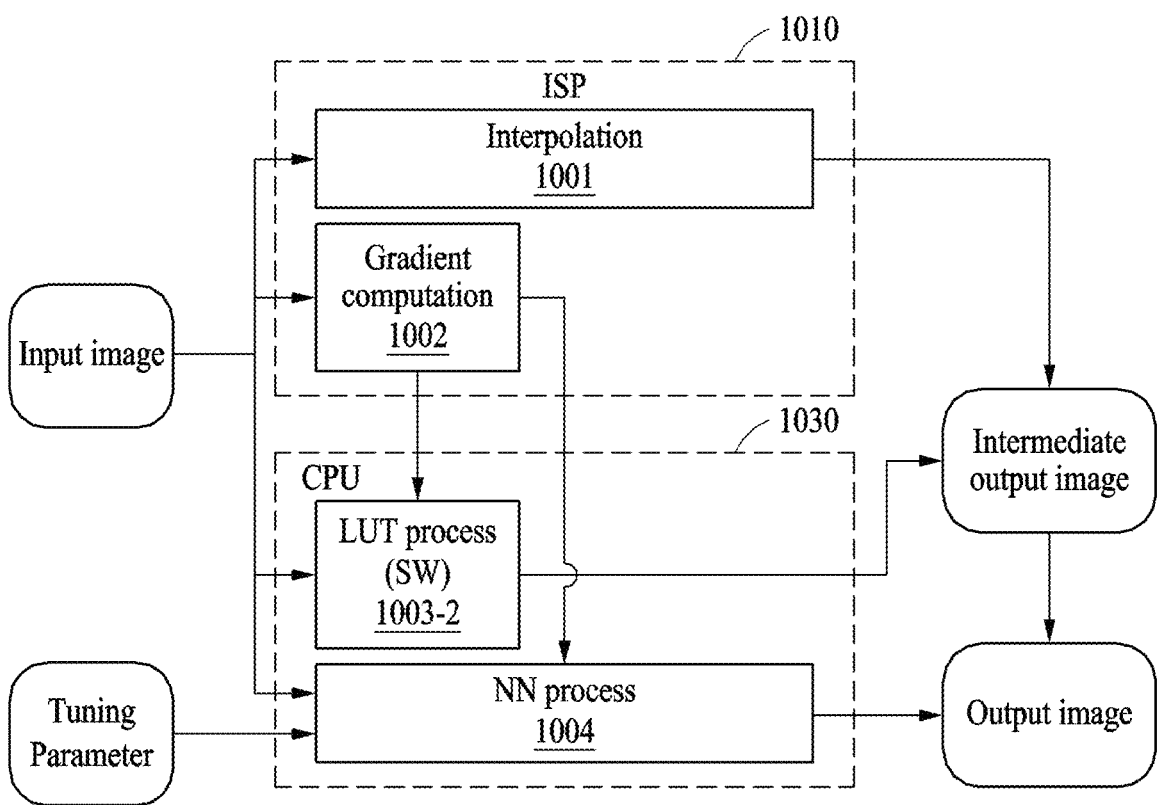

FIGS. 10A through 10C are diagrams illustrating examples of a hardware processing path of an SR method according to an example embodiment.

Referring to FIG. 10A, a LUT process 1003-1 may be implemented as hardware (HW). For example, the LUT process 1003-1 may be independently implemented in an ISP 1010 as hardware.

For example, the ISP 1010 may be configured to perform an interpolation process 1001 for generating a baseline image by applying interpolation to an input image. For example, the ISP 1010 may be configured to perform a gradient computation process 1002 for calculating a gradient of the input image. An operation of generating an intermediate output image may be implemented as hardware and performed by the ISP 1010.

Referring to FIGS. 10B and 10C, a LUT process 1003-2 may be implemented as software (SW), and the LUT process 1003-2 implemented as software may be performed by a processing unit of a device such as a central processing unit (CPU) 1030 or the like.

Referring to FIGS. 10A and 10B, a NN process 1004 may be performed by a neural processing unit (NPU) 1020. Referring to FIG. 10C, the NN process 1004 may be performed by the CPU 1030.

According to an example embodiment, the LUT process 1003-1 or 1003-2 and/or the NN process 1004 included in the SR method described herein may selectively use a processing device including the ISP 1010, the CPU 1030, and the NPU 1020 according to a usage environment. This may enable effective load balancing of an apparatus for processing the SR method.

According to an example embodiment, the LUT process 1003-1 or 1003-2 and the NN process 1004 may be processed in parallel in different modules. Such parallel processing of the LUT process 1003-1 or 1003-2 and the NN process 1004, which have a relatively large amount of computation among processes included in the SR method, may increase an execution speed of an SR operation.

Figure 11:
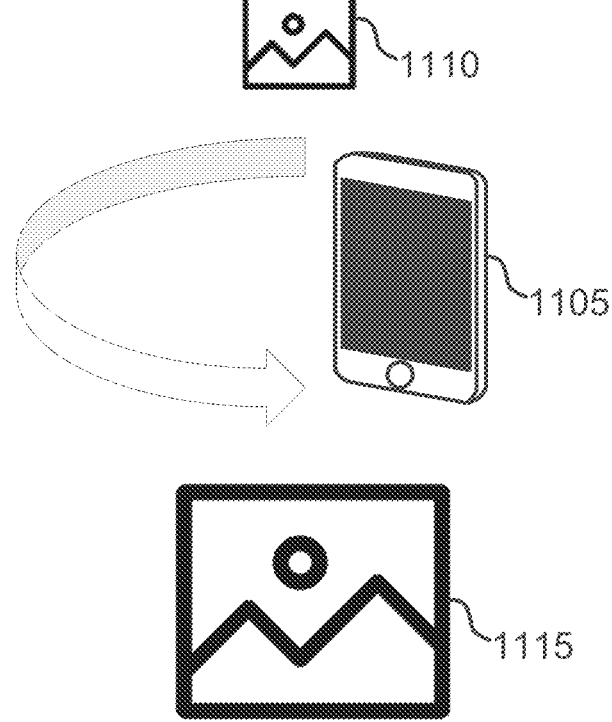
FIG. 11 is a diagram illustrating image SR according to an example embodiment.

FIG. 11 is a diagram illustrating image SR 1100 according to an example embodiment. In some embodiments, the image SR 1100 may be performed by a mobile device 1105. The mobile device may be a personal computer, laptop computer, personal assistant, mobile phone, or any other suitable processing apparatus. In some examples, the mobile device 1105 includes software that enhances or increases the resolution of images (i.e., SR software). In some cases, the mobile device 1105 may include a neural network process implemented using software or hardware. Due to limitations on the computing resources available, some computationally intensive SR process are not appropriate for performing on the mobile device 1105

For example, the mobile device may include an SR application that can take an input image 1110 (i.e., a low-resolution image) and generate an output image 1115 (i.e., a high-resolution image). The output image 1115 has a higher resolution than the input image 1110. In some cases, the mobile device 1105 has limited processing power, so the SR application can compute gradients within the input image 1110. Different direction types may be detected based on the gradients. Lookup tables may be used to perform efficient SR on the input image 1110 based on the direction types. In some cases, areas that are likely to include objects can be detected based on the gradients and differential processing may be used to reduce processing complexity in areas of the input image 1110 that are unlikely to include an object of interest. Details of the processes used by mobile device 1105 are disclosed herein, and enable the mobile device 1105 to perform efficient SR to enhance the resolution of images at levels unattainable without the methods described herein.

Figure 12:
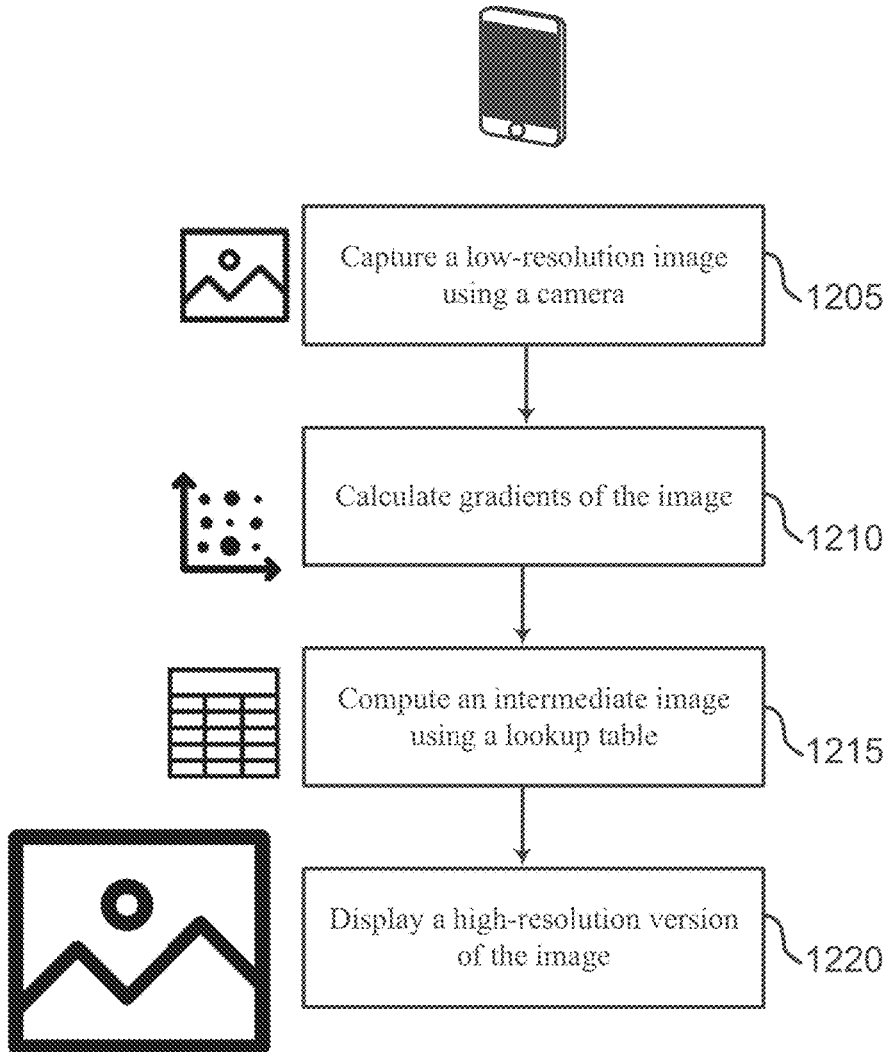
FIG. 12 is a flowchart illustrating an image SR process according to an example embodiment.

FIG. 12 is a flowchart illustrating an image SR process 1200 according to an example embodiment. The operations of SR process 1200 may be performed using software or hardware as described with reference to FIGS. 1-11.

At operation 1205, a user captures a low-resolution image using a camera on a mobile device. For example, the image may include different regions (i.e., a first part and a second part).

At operation 1210, an SR application calculates gradients for different regions of the image (e.g., a first gradient for the first part and a second gradient for the second part). In some cases the first part is a first pixel or set of pixels and the second part is a second pixel or set of pixels in a different area of the image.

At operation 1215, the SR application computes an intermediate image using a lookup table based on the gradients. For example, the SR application may look up a first kernel shape for the first part and a second kernel shape for the second part based on the first gradient and the second gradient, respectively. The intermediate image may be generated based on the first kernel shape and the second kernel shape.

At operation 1220, the mobile device displays (or stores) a high-resolution version of the image based on the intermediate image. For example, the high-resolution version may have more pixels than the low-resolution version.

The examples described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as, parallel processors.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of performing super-resolution (SR), comprising:
   determining a direction type of an input image based on a gradient of the input image;
   obtaining a first intermediate image based on the direction type using a look-up table (LUT) that stores an SR operation result of a pixel value combination corresponding to a kernel set mapped to the determined direction type, wherein the first intermediate image is an SR image corresponding to the input image;

applying SR interpolation to the input image to obtain a baseline image; and obtaining an output image based on the first intermediate image and the baseline image, which comprises: obtaining an intermediate output image based on the baseline image and the first intermediate image; obtaining a second intermediate image by applying the input image to an SR neural network; and obtaining the output image based on the second intermediate image and the intermediate output image.

2. The method of claim 1, wherein the obtaining of the first intermediate image comprises:

extracting a non-flat region from the input image based on the gradient; and obtaining the first intermediate image corresponding to the non-flat region based on a value stored in the LUT corresponding to the non-flat region of the input image.

3. The method of claim 1, wherein the LUT comprises a plurality of SR operation results respectively corresponding to a plurality of kernels comprised in a plurality of kernel sets mapped to a plurality of preset direction types, wherein the SR operation result comprises a pixel value of the SR image mapped to each of a plurality of pixel value combinations corresponding to a size of the kernel.

4. The method of claim 1, wherein the kernel set includes a plurality of kernels having different respective shapes.

5. The method of claim 1, wherein the obtaining of the second intermediate image comprises:

obtaining the second intermediate image by applying the input image and a tuning parameter for image processing to the neural network, wherein the neural network is trained to output the SR image at a high resolution based on a low-resolution image and a tuning parameter corresponding to the low-resolution image.

6. The method of claim 5, wherein the tuning parameter comprises at least one of:

a value indicating a noise level of the input image;

a blurring kernel of the input image; or a standard deviation of a Gaussian kernel for blurring the input image.

7. The method of claim 1, further comprising:

outputting, in real time, the intermediate output image through a camera preview; and providing the output image as a captured image of the input image.

8. The method of claim 1, wherein the obtaining of the output image comprises:

obtaining the output image based on the second intermediate image corresponding to a non-flat region of the input image and the intermediate output image, wherein the non-flat region of the input image comprises at least a portion of the input image extracted based on the gradient of the input image.

9. The method of claim 1, wherein the first intermediate image is a corrected SR image corresponding to the second intermediate image, and wherein the LUT stores an SR correction result of the pixel value combination corresponding to the kernel set mapped to the determined direction type.

10. The method of claim 1, wherein the output image is obtained by applying the intermediate output image to an SR correction neural network.

11. The method of claim 1, wherein the determining of the direction type of the input image comprises:

obtaining a differential element for each axis of the input image by applying a mask for a differential for each axis of the input image; and determining one of a plurality of preset direction types as the direction type of the input image based on an angle of a gradient of the input image obtained from the differential element for each axis of the input image.

12. The method of claim 1, wherein the obtaining of the output image comprises:

computing a sum of a pixel value of the baseline image and a pixel value of the first intermediate image, wherein the output image is obtained based on the sum.

13. A non-transitory computer-readable storage medium storing instructions that, when executed by a processor, cause the processor to perform a method for performing super-resolution (SR), wherein the method comprises:

determining a direction type of an input image based on a gradient of the input image;

obtaining a first intermediate image based on the direction type using a look-up table (LUT) that stores an SR operation result of a pixel value combination corresponding to a kernel set mapped to the determined direction type, wherein the first intermediate image is an SR image corresponding to the input image;

applying SR interpolation to the input image to obtain a baseline image; and obtaining an output image based on the first intermediate image and the baseline image, wherein the determining of the direction type of the input image comprises:

obtaining a differential element for each axis of the input image by applying a mask for a differential for each axis of the input image; and determining one of a plurality of preset direction types as the direction type of the input image based on an angle of a gradient of the input image obtained from the differential element for each axis of the input image.

14. An apparatus for super-resolution (SR) image processing, the apparatus comprising:

at least one processor configured to:

determine a direction type of an input image based on a gradient of the input image;

obtain a first intermediate image based on the direction type using a look-up table (LUT) that stores an SR operation result of a pixel value combination corresponding to a kernel set mapped to the determined direction type, wherein the first intermediate image is an SR image corresponding to the input image;

apply SR interpolation to the input image to obtain a baseline image; and obtain an output image based on the first intermediate image and the baseline image, wherein the at least one processor is configured to obtain the first intermediate image by:

obtaining a second intermediate image by applying the input image to an SR neural network, wherein the first intermediate image is a corrected SR image corresponding to the second intermediate image, and wherein the LUT stores a SR correction result of the pixel value combination corresponding to the kernel set mapped to the determined direction type.

15. The apparatus of claim 14, further comprising:

a memory configured to store the LUT.

16. The apparatus of claim 14, wherein the processor is configured to obtain the first intermediate image by:

extracting a non-flat region from the input image based on the gradient; and obtaining the first intermediate image corresponding to the non-flat region, based on a value stored in the LUT corresponding to the non-flat region of the input image.

17. The apparatus of claim 14, wherein the processor is configured to obtain the output image by:

obtaining an intermediate output image based on the baseline image and the first intermediate image; and obtaining the output image based on the second intermediate image and the intermediate output image.

18. The apparatus of claim 17, wherein the processor is configured to obtain the second intermediate image by:

obtaining the second intermediate image by applying the input image and a tuning parameter for image processing to the neural network, wherein the neural network is trained to output the SR image at a high resolution based on a low-resolution image and a tuning parameter corresponding to the low-resolution image.

19. The apparatus of claim 14, wherein the kernel set includes a plurality of kernels having different respective shapes.

20. The apparatus of claim 14, wherein the processor is configured to obtain the output image by:

obtaining an intermediate output image based on the baseline image and the first intermediate image; and obtaining the output image by applying the intermediate output image to an SR correction neural network.

* * * * *